US010832520B2

(12) United States Patent
Arnone et al.

(10) Patent No.: US 10,832,520 B2
(45) Date of Patent: Nov. 10, 2020

(54) FUNGIBLE OBJECT AWARD INTERLEAVED WAGERING SYSTEM

(71) Applicant: Gamblit Gaming, LLC, Glendale, CA (US)

(72) Inventors: Miles Arnone, Sherborn, MA (US); Frank Cire, Pasadena, CA (US); Clifford Kaylin, Los Angeles, CA (US); Eric Meyerhofer, Pasadena, CA (US)

(73) Assignee: Gamblit Gaming, LLC, Monrovia, CA (US)

( * ) Notice: Subject to any disclaimer, the term of this patent is extended or adjusted under 35 U.S.C. 154(b) by 0 days.

(21) Appl. No.: 16/237,025

(22) Filed: Dec. 31, 2018

(65) Prior Publication Data

US 2019/0139360 A1 May 9, 2019

Related U.S. Application Data

(63) Continuation of application No. 15/837,795, filed on Dec. 11, 2017, now Pat. No. 10,169,953, which is a (Continued)

(51) Int. Cl.
*G06F 17/00* (2019.01)
*G07F 17/32* (2006.01)

(52) U.S. Cl.
CPC ...... *G07F 17/3244* (2013.01); *G07F 17/3223* (2013.01); *G07F 17/3225* (2013.01)

(58) Field of Classification Search
None
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

JP 20040097610 A1 5/2004

OTHER PUBLICATIONS

U.S. Appl. No. 14/815,764 Arnone, et al. filed Jul. 31, 2015.
(Continued)

*Primary Examiner* — Paul A D'Agostino
(74) *Attorney, Agent, or Firm* — Frank Cire

(57) ABSTRACT

A fungible object award interleaved wagering system includes a plurality of interactive controllers operatively connected to an application controller by a network, each interactive controller configured to: communicate, to an application controller, application telemetry; and receive, from the application controller, an object based on the application telemetry. The system also includes a wager controller operatively connected to the application controller, the wager controller constructed to: receive a wager request; generate a wager outcome based on the wager request; communicate, to an object controller, the wager outcome. The system also includes the application controller operatively connected to the plurality of interactive controllers and the wager controller, the application controller constructed to: receive; communicate, to the wager controller, the wager request based on the received application telemetry; receive an object, wherein the object is generated by the object controller based on the wager outcome; communicate, to each interactive controller, the object.

11 Claims, 18 Drawing Sheets

Related U.S. Application Data continuation of application No. 14/570,746, filed on Dec. 15, 2014, now Pat. No. 9,842,465.

(60) Provisional application No. 61/916,197, filed on Dec. 14, 2013.

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,302,791 | B1 | 10/2001 | Frohm et al. |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,647 | B2 | 4/2012 | House |
| 8,157,653 | B2 | 4/2012 | Buhr |
| 8,167,695 | B2 | 5/2012 | Rowe |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,430,735 | B2 | 4/2013 | Oberberger |
| 8,460,091 | B2 | 6/2013 | Wells |
| 8,463,711 | B2 | 6/2013 | Cunningham, II |
| 8,475,266 | B2 | 7/2013 | Arnone |
| 8,480,470 | B2 | 7/2013 | Napolitano et al. |
| 8,485,893 | B2 | 7/2013 | Rowe |
| 8,622,809 | B1 | 1/2014 | Arora et al. |
| 8,777,737 | B2 | 7/2014 | LeMay |
| 8,864,564 | B2 | 10/2014 | Oberberger |
| 8,998,694 | B2 | 4/2015 | Rowe |
| 9,070,257 | B1 | 6/2015 | Scalise |
| 9,092,946 | B2 | 7/2015 | Rowe |
| 9,111,412 | B2 | 8/2015 | Rowe |
| 9,454,873 | B2 | 9/2016 | Rowe |
| 9,842,465 | B2 | 12/2017 | Arnone |
| 2001/0004609 | A1 | 6/2001 | Walker et al. |
| 2001/0019965 | A1 | 9/2001 | Ochi |
| 2002/0022509 | A1 | 2/2002 | Nicastro |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Malice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |

(56) References Cited

U.S. PATENT DOCUMENTS

| | | | |
|---|---|---|---|
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0239610 | A1 | 9/2009 | Olive |
| 2009/0247272 | A1 | 10/2009 | Abe |
| 2009/0270164 | A1 | 10/2009 | Seelig |
| 2009/0275396 | A1 | 11/2009 | Felice |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0285869 | A1 | 11/2010 | Walker |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0070945 | A1 | 3/2011 | Walker |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0302311 | A1 | 11/2012 | Luciano |
| 2012/0322545 | A1 | 12/2012 | Arnone et al. |
| 2013/0029760 | A1 | 1/2013 | Wickett |
| 2013/0131848 | A1 | 5/2013 | Arnone et al. |
| 2013/0190074 | A1 | 7/2013 | Arnone et al. |
| 2013/0260869 | A1 | 10/2013 | Leandro et al. |
| 2014/0087801 | A1 | 3/2014 | Nicely et al. |
| 2014/0087808 | A1 | 3/2014 | Leandro et al. |
| 2014/0087809 | A1 | 3/2014 | Leupp et al. |
| 2014/0357350 | A1 | 12/2014 | Weingardt et al. |
| 2017/0148271 | A1 | 5/2017 | Graboyes et al. |

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.

(56) References Cited

OTHER PUBLICATIONS

U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 16/108,049 Arnone, et al. filed Aug. 21, 2018.
U.S. Appl. No. 16/108,052 Arnone, et al. filed Aug. 21, 2018.
U.S. Appl. No. 16/108,056 Arnone, et al. filed Aug. 21, 2018.
U.S. Appl. No. 16/113,494 Arnone, et al. filed Aug. 27, 2018.
U.S. Appl. No. 16/113,612 Arnone, et al. filed Aug. 27, 2018.
U.S. Appl. No. 16/120,619 Arnone, et al. filed Sep. 4, 2018.
U.S. Appl. No. 16/120,691 Arnone, et al. filed Sep. 4, 2018.
U.S. Appl. No. 16/126,151 Arnone, et al. filed Sep. 10, 2018.
U.S. Appl. No. 16/126,547 Arnone, et al. filed Sep. 10, 2018.
U.S. Appl. No. 16/127,184 Arnone, et al. filed Sep. 10, 2018.
U.S. Appl. No. 16/128,364 Arnone, et al. filed Sep. 11, 2018.
U.S. Appl. No. 16/128,484 Arnone, et al. filed Sep. 11, 2018.
U.S. Appl. No. 16/129,752 Arnone, et al. filed Sep. 12, 2018.
U.S. Appl. No. 16/141,208 Arnone, et al. filed Sep. 25, 2018.
U.S. Appl. No. 16/141,222 Arnone, et al. filed Sep. 25, 2018.
U.S. Appl. No. 16/149,065 Arnone, et al. filed Oct. 1, 2018.
U.S. Appl. No. 16/149,675 Arnone, et al. filed Oct. 2, 2018.
U.S. Appl. No. 16/149,940 Arnone, et al. filed Oct. 2, 2018.
U.S. Appl. No. 16/161,009 Arnone, et al. filed Oct. 15, 2018.
U.S. Appl. No. 16/161,011 Arnone, et al. filed Oct. 15, 2018.
U.S. Appl. No. 16/169,992 Arnone, et al. filed Oct. 24, 2018.
U.S. Appl. No. 16/181,944 Arnone, et al. filed Nov. 6, 2018.
U.S. Appl. No. 16/182,010 Arnone, et al. filed Nov. 6, 2018.
U.S. Appl. No. 16/186,087 Arnone, et al. filed Nov. 9, 2018.
U.S. Appl. No. 16/188,945 Arnone, et al. filed Nov. 13, 2018.
U.S. Appl. No. 16/196,512 Arnone, et al. filed Nov. 20, 2018.
U.S. Appl. No. 16/201,149 Arnone, et al. filed Nov. 27, 2018.
U.S. Appl. No. 16/201,174 Arnone, et al. filed Nov. 27, 2018.
U.S. Appl. No. 16/201,195 Arnone, et al. filed Nov. 27, 2018.
U.S. Appl. No. 16/209,159 Arnone, et al. filed Dec. 4, 2018.
U.S. Appl. No. 16/209,188 Arnone, et al. filed Dec. 4, 2018.
U.S. Appl. No. 16/209,942 Arnone, et al. filed Dec. 4, 2018.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.
U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.
U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
U.S. Appl. No. 15/431,631 Arnone, et al. filed Feb. 13, 2017.
U.S. Appl. No. 15/434,843 Arnone, et al. filed Feb. 16, 2017.
U.S. Appl. No. 15/439,499 Arnone, et al. filed Feb. 22, 2017.
U.S. Appl. No. 15/449,249 Arnone, et al. filed Mar. 3, 2017.
U.S. Appl. No. 15/449,256 Arnone, et al. filed Mar. 3, 2017.
U.S. Appl. No. 15/450,287 Arnone, et al. filed Mar. 6, 2017.
U.S. Appl. No. 15/456,079 Arnone, et al. filed Mar. 10, 2017.
U.S. Appl. No. 15/457,827 Arnone, et al. filed Mar. 13, 2017.
U.S. Appl. No. 15/458,490 Arnone, et al. filed Mar. 14, 2017.
U.S. Appl. No. 15/460,195 Arnone, et al. filed Mar. 15, 2017.
U.S. Appl. No. 15/463,725 Arnone, et al. filed Mar. 20, 2017.
U.S. Appl. No. 15/464,282 Arnone, et al. filed Mar. 20, 2017.
U.S. Appl. No. 15/465,521 Arnone, et al. filed Mar. 21, 2017.
U.S. Appl. No. 15/470,869 Arnone, et al. filed Mar. 27, 2017.
U.S. Appl. No. 15/473,523 Arnone, et al. filed Mar. 29, 2017.
U.S. Appl. No. 15/483,773 Arnone, et al. filed Apr. 10, 2017.
U.S. Appl. No. 15/489,343 Arnone, et al. filed Apr. 17, 2017.
U.S. Appl. No. 15/491,617 Arnone, et al. filed Apr. 19, 2017.
U.S. Appl. No. 15/583,295 Arnone, et al. filed May 1, 2017, 2017.
U.S. Appl. No. 15/589,780 Arnone, et al. filed May 8, 2017.
U.S. Appl. No. 15/597,123 Arnone, et al. filed May 16, 2017.
U.S. Appl. No. 15/597,812 Arnone, et al. filed May 17, 2017.
U.S. Appl. No. 15/599,590 Arnone, et al. filed May 19, 2017.
U.S. Appl. No. 15/605,688 Arnone, et al. filed May 25, 2017.
U.S. Appl. No. 15/605,705 Arnone, et al. filed May 25, 2017.
U.S. Appl. No. 15/626,754 Arnone, et al. filed Jun. 19, 2017.
U.S. Appl. No. 15/631,762 Arnone, et al. filed Jun. 23, 2017.
U.S. Appl. No. 15/632,478 Arnone, et al. filed Jun. 26, 2017.
U.S. Appl. No. 15/632,479 Arnone, et al. filed Jun. 26, 2017.
U.S. Appl. No. 15/632,943 Arnone, et al. filed Jun. 26, 2017.
U.S. Appl. No. 15/632,950 Arnone, et al. filed Jun. 26, 2017.

(56) References Cited

OTHER PUBLICATIONS

U.S. Appl. No. 15/641,119 Arnone, et al. filed Jul. 3, 2017.
U.S. Appl. No. 15/651,934 Arnone, et al. filed Jul. 17, 2017.
U.S. Appl. No. 15/657,826 Arnone, et al. filed Jul. 24, 2017.
U.S. Appl. No. 15/657,835 Arnone, et al. filed Jul. 24, 2017.
U.S. Appl. No. 15/664,535 Arnone, et al. filed Jul. 31, 2017.
U.S. Appl. No. 15/667,168 Arnone, et al. filed Aug. 2, 2017.
U.S. Appl. No. 15/670,492 Arnone, filed Aug. 7, 2017.
U.S. Appl. No. 15/681,966 Arnone, et al. filed Aug. 21, 2017.
U.S. Appl. No. 15/681,970 Arnone, et al. filed Aug. 21, 2017.
U.S. Appl. No. 15/681,978 Arnone, et al. filed Aug. 21, 2017.
U.S. Appl. No. 15/687,922 Arnone, et al. filed Aug. 28, 2017.
U.S. Appl. No. 15/687,927 Arnone, et al. filed Aug. 28, 2017.
U.S. Appl. No. 15/694,520 Arnone, et al. filed Sep. 1, 2017.
U.S. Appl. No. 15/694,738 Arnone, et al. filed Sep. 1, 2017.
U.S. Appl. No. 15/700,022 Arnone, et al. filed Sep. 8, 2017.
U.S. Appl. No. 15/713,595 Arnone, et al. filed Sep. 22, 2017.
U.S. Appl. No. 15/714,896 Arnone, et al. filed Sep. 25, 2017.
U.S. Appl. No. 15/714,902 Arnone, et al. filed Sep. 25, 2017.
U.S. Appl. No. 15/715,144 Arnone, et al. filed Sep. 25, 2017.
U.S. Appl. No. 15/716,317 Arnone, et al. filed Sep. 26, 2017.
U.S. Appl. No. 15/716,318 Arnone, et al. filed Sep. 26, 2017.
U.S. Appl. No. 15/728,096 Arnone, et al. filed Oct. 9, 2017.
U.S. Appl. No. 15/784,961 Arnone, et al. filed Oct. 16, 2017.
U.S. Appl. No. 15/790,482 Arnone, et al. filed Oct. 23, 2017.
U.S. Appl. No. 15/794,712 Arnone, et al. filed Oct. 26, 2017.
U.S. Appl. No. 15/797,571 Arnone, et al. filed Oct. 30, 2017.
U.S. Appl. No. 15/804,413 Arnone, et al. filed Nov. 6, 2017.
U.S. Appl. No. 15/811,412 Arnone, et al. filed Nov. 13, 2017.
U.S. Appl. No. 15/811,419 Arnone, et al. filed Nov. 13, 2017.
U.S. Appl. No. 15/815,629 Arnone, et al. filed Nov. 16, 2017.
U.S. Appl. No. 15/822,908 Arnone, et al. filed Nov. 27, 2017.
U.S. Appl. No. 15/822,912 Arnone, et al. filed Nov. 27, 2017.
U.S. Appl. No. 15/830,614 Arnone, et al. filed Dec. 4, 2017.
U.S. Appl. No. 15/834,006 Arnone, et al. filed Dec. 6, 2017.
U.S. Appl. No. 15/837,795 Arnone, et al. filed Dec. 11, 2017.
U.S. Appl. No. 15/845,433 Arnone, et al. filed Dec. 18, 2017.
U.S. Appl. No. 15/858,817 Arnone, et al. filed Dec. 29, 2017.
U.S. Appl. No. 15/858,826 Arnone, et al. filed Dec. 29, 2017.
U.S. Appl. No. 15/862,329 Arnone, et al. filed Jan. 4, 2018.
U.S. Appl. No. 15/864,737 Arnone, et al. filed Jan. 8, 2018.
U.S. Appl. No. 15/882,328 Arnone, et al. filed Jan. 29, 2018.
U.S. Appl. No. 15/882,333 Arnone, et al. filed Jan. 29, 2018.
U.S. Appl. No. 15/882,428 Arnone, et al. filed Jan. 29, 2018.
U.S. Appl. No. 15/882,447 Arnone, et al. filed Jan. 29, 2018.
U.S. Appl. No. 15/882,850 Arnone, et al. filed Jan. 29, 2018.
U.S. Appl. No. 15/882,902 Arnone, et al. filed Jan. 29, 2018.
U.S. Appl. No. 15/888,512 Arnone, et al. filed Feb. 5, 2018.
U.S. Appl. No. 15/894,398 Arnone, et al. filed Feb. 12, 2018.
U.S. Appl. No. 15/912,019 Arnone, et al. filed Mar. 5, 2018.
U.S. Appl. No. 15/912,026 Arnone, et al. filed Mar. 5, 2018.
U.S. Appl. No. 15/912,529 Arnone, et al. filed Mar. 5, 2018.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 24, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 15/920,374 Arnone, et al. filed Mar. 13, 2018.
U.S. Appl. No. 15/920,380 Arnone, et al. filed Mar. 13, 2018.
U.S. Appl. No. 15/920,388 Arnone, et al. filed Mar. 13, 2018.
U.S. Appl. No. 15/920,390 Arnone, et al. filed Mar. 13, 2018.
U.S. Appl. No. 15/922,816 Arnone, et al. filed Mar. 15, 2018.
U.S. Appl. No. 15/922,905 Arnone, et al. filed Mar. 15, 2018.
U.S. Appl. No. 15/925,268 Arnone, et al. filed Mar. 19, 2018.
U.S. Appl. No. 15/925,751 Arnone, et al. filed Mar. 19, 2018.
U.S. Appl. No. 15/933,319 Arnone, et al. filed Mar. 22, 2018.
U.S. Appl. No. 15/935,956 Arnone, et al. filed Mar. 26, 2018.
U.S. Appl. No. 15/943,207 Arnone, et al. filed Apr. 2, 2018.
U.S. Appl. No. 15/948,607 Arnone, et al. filed Apr. 9, 2018.
U.S. Appl. No. 15/949,812 Arnone, et al. filed Apr. 10, 2018.
U.S. Appl. No. 15/951,155 Arnone, et al. filed Apr. 11, 2018.
U.S. Appl. No. 15/954,094 Arnone, et al. filed Apr. 16, 2018.
U.S. Appl. No. 15/954,136 Arnone, et al. filed Apr. 16, 2018.
U.S. Appl. No. 15/961,375 Arnone, et al. filed Apr. 24, 2018.
U.S. Appl. No. 15/961,382 Arnone, et al. filed Apr. 24, 2018.
U.S. Appl. No. 15/966,590 Arnone, et al. filed Apr. 30, 2018.
U.S. Appl. No. 15/968,723 Arnone, et al. filed May 1, 2018.
U.S. Appl. No. 15/971,288 Arnone, et al. filed May 4, 2018.
U.S. Appl. No. 15/978,087 Arnone, et al. filed May 11, 2018.
U.S. Appl. No. 15/979,391 Arnone, et al. filed May 14, 2018.
U.S. Appl. No. 15/984,168 Arnone, et al. filed May 18, 2018.
U.S. Appl. No. 15/991,576 Arnone, et al. filed May 29, 2018.
U.S. Appl. No. 15/991,594 Arnone, et al. filed May 29, 2018.
U.S. Appl. No. 15/996,906 Arnone, et al. filed Jun. 4, 2018.
U.S. Appl. No. 16/005,017 Arnone, et al. filed Jun. 11, 2018.
U.S. Appl. No. 16/005,108 Arnone, et al. filed Jun. 11, 2018.
U.S. Appl. No. 16/011,110 Arnone, et al. filed Jun. 18, 2018.
U.S. Appl. No. 16/011,116 Arnone, et al. filed Jun. 18, 2018.
U.S. Appl. No. 16/017,976 Arnone, et al. filed Jun. 25, 2018.
U.S. Appl. No. 16/025,380 Arnone, et al. filed Jul. 2, 2018.
U.S. Appl. No. 16/030,289 Arnone, et al. filed Jul. 9, 2018.
U.S. Appl. No. 16/030,294 Arnone, et al. filed Jul. 9, 2018.
U.S. Appl. No. 16/036,269 Arnone, et al. filed Jul. 16, 2018.
U.S. Appl. No. 16/036,388 Arnone, et al. filed Jul. 16, 2018.
U.S. Appl. No. 16/036,393 Arnone, et al. filed Jul. 16, 2018.
U.S. Appl. No. 16/036,925 Arnone, et al. filed Jul. 16, 2018.
U.S. Appl. No. 16/039,322 Arnone, et al. filed Jul. 18, 2018.
U.S. Appl. No. 16/040,485 Arnone, et al. filed Jul. 19, 2018.
U.S. Appl. No. 16/042,488 Arnone, et al. filed Jul. 23, 2018.
U.S. Appl. No. 16/042,493 Arnone, et al. filed Jul. 23, 2018.
U.S. Appl. No. 16/048,893 Arnone, et al. filed Jul. 30, 2018.
U.S. Appl. No. 16/049,029 Arnone, et al. filed Jul. 30, 2018.
U.S. Appl. No. 16/057,400 Arnone, et al. filed Aug. 7, 2018.
U.S. Appl. No. 16/057,403 Arnone, et al. filed Aug. 7, 2018.
U.S. Appl. No. 16/102,003 Arnone, et al. filed Aug. 13, 2018.
U.S. Appl. No. 16/102,010 Arnone, et al. filed Aug. 13, 2018.
U.S. Appl. No. 16/102,044 Arnone, et al. filed Aug. 13, 2018.
U.S. Appl. No. 15/063,365 Arnone, et al. filed Mar. 7, 2016.

(56) References Cited

OTHER PUBLICATIONS

U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 7, 2016.
U.S. Appl. No. 14/799,481 Arnone, et al. filed Jul. 14, 2015.
U.S. Appl. No. 15/362,214 Arnone, et al. filed Nov. 28, 2016.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.

FUNGIBLE OBJECT AWARD INTERLEAVED WAGERING SYSTEM

CROSS REFERENCE TO RELATED APPLICATIONS

This application is a continuation of U.S. patent application Ser. No. 15/837,795, filed Dec. 11, 2017, which is a continuation of U.S. patent application Ser. No. 14/570,746, filed Dec. 15, 2014, now issued as U.S. Pat. No. 9,842,465 on Dec. 12, 2017, which claims the benefit of U.S. Provisional Patent Application No. 61/916,197, filed Dec. 14, 2013, the disclosure of which is incorporated by reference herein in its entirety.

This application references Patent Cooperation Treaty Application No. PCT/US11/26768, filed Mar. 1, 2011, Patent Cooperation Treaty Application No. PCT/US11/63587, filed Dec. 6, 2011, and Patent Cooperation Treaty Application No. PCT/US12/58156, filed Sep. 29, 2012, the contents of each of which are hereby incorporated by reference.

FIELD OF THE INVENTION

Embodiments of the present invention are generally related to communications within data processing systems. More particularly, the present invention relates to the communication and processing of wagering data.

BACKGROUND

The gaming industry has traditionally developed electronic gaming machines that present simple wagering games to a user. The communication and processing needs for these simple wagering games are easily met using conventional processing systems. However, more complicated wagering games need communication and processing systems that are better suited for implementing these more complicated wagering games. Various aspects of embodiments of the present invention meet such a need.

SUMMARY OF THE INVENTION

Systems and methods in accordance with embodiments of the invention provide a communication and data processing system constructed for a fungible object award interleaved wagering system.

One embodiment includes a fungible object award interleaved wagering system, including a plurality of interactive controllers operatively connected to an application controller by a network, each interactive controller configured to: communicate, to an application controller, application telemetry; and receive, from the application controller, an object based on the application telemetry. The system also includes a wager controller operatively connected to the application controller, the wager controller constructed to: receive a wager request; generate a wager outcome based on the wager request; communicate, to an object controller, the wager outcome. The system also includes the application controller operatively connected to the plurality of interactive controllers and the wager controller, the application controller constructed to: receive; communicate, to the wager controller, the wager request based on the received application telemetry; receive an object, wherein the object is generated by the object controller based on the wager outcome; communicate, to one of the plurality of interactive controllers, the object.

In a further embodiment, the wager controller and the application controller are constructed from a same device.

In a further embodiment, the wager controller and the application controller are constructed from different devices.

In a further embodiment, the wager controller is operatively connected to the application controller by the network.

In a further embodiment, the object controller is constructed to: receive, from the wager controller, the wager outcome; generate the object based on the wager outcome; and communicate, to the application controller, the generated object.

In a further embodiment, the object controller is further constructed to record object characteristics associated with the generated object upon generating the object.

In a further embodiment, one of the plurality of interactive controllers is further configured to: communicate, to the application controller, object use information, the object use information based on use of the object in an interactive application provided by one of the plurality of interactive controllers, the application controller is further constructed to: receive, from one of the plurality of interactive controllers, the object use information; and communicate, to the object controller, the object use information, wherein the object controller uses the object use information to update object characteristics associated with the object.

In a further embodiment, the object use information comprises durability information.

In a further embodiment, one of the plurality of interactive controllers is further configured to: communicate, to the application controller, an indication to sell the object, the application controller is further constructed to: receive, from the one of the plurality of interactive controllers, the indication to sell the object; and communicate, to the object controller, the indication to sell the object, and the wager controller is further constructed to: receive, from the object controller, the indication to sell the object; and adjust a meter associated with the user to reflect sale of the object.

In a further embodiment, the indication to sell the object comprises an object value.

In a further embodiment, each interactive controller is further configured to disable use of the object in an interactive application provided by the interactive controller upon sale of the object.

Another embodiment includes a fungible object award interleaved wagering system, including: a plurality of interactive controllers operatively connected to an application controller, one of the plurality of interactive controller configured to: communicate, to an application controller, application telemetry; and receive, from the application controller, an object based on the application telemetry; a wager controller operatively connected to the application controller by a network, the wager controller constructed to: receive, from the application controller, a wager request; generate a wager outcome based on the wager request; communicate, to an object controller, the wager outcome; and the application controller operatively connected to the plurality of interactive controllers and the wager controller, the application controller constructed to: receive, from one of the plurality of interactive controller, the application telemetry; communicate, to the wager controller, the wager request based on the received application telemetry; receive, from the object controller, an object, wherein the object is generated by the object controller based on the wager outcome; communicate, to the one of the plurality of interactive controller, the object.

DETAILED DESCRIPTION

Figure 1A:
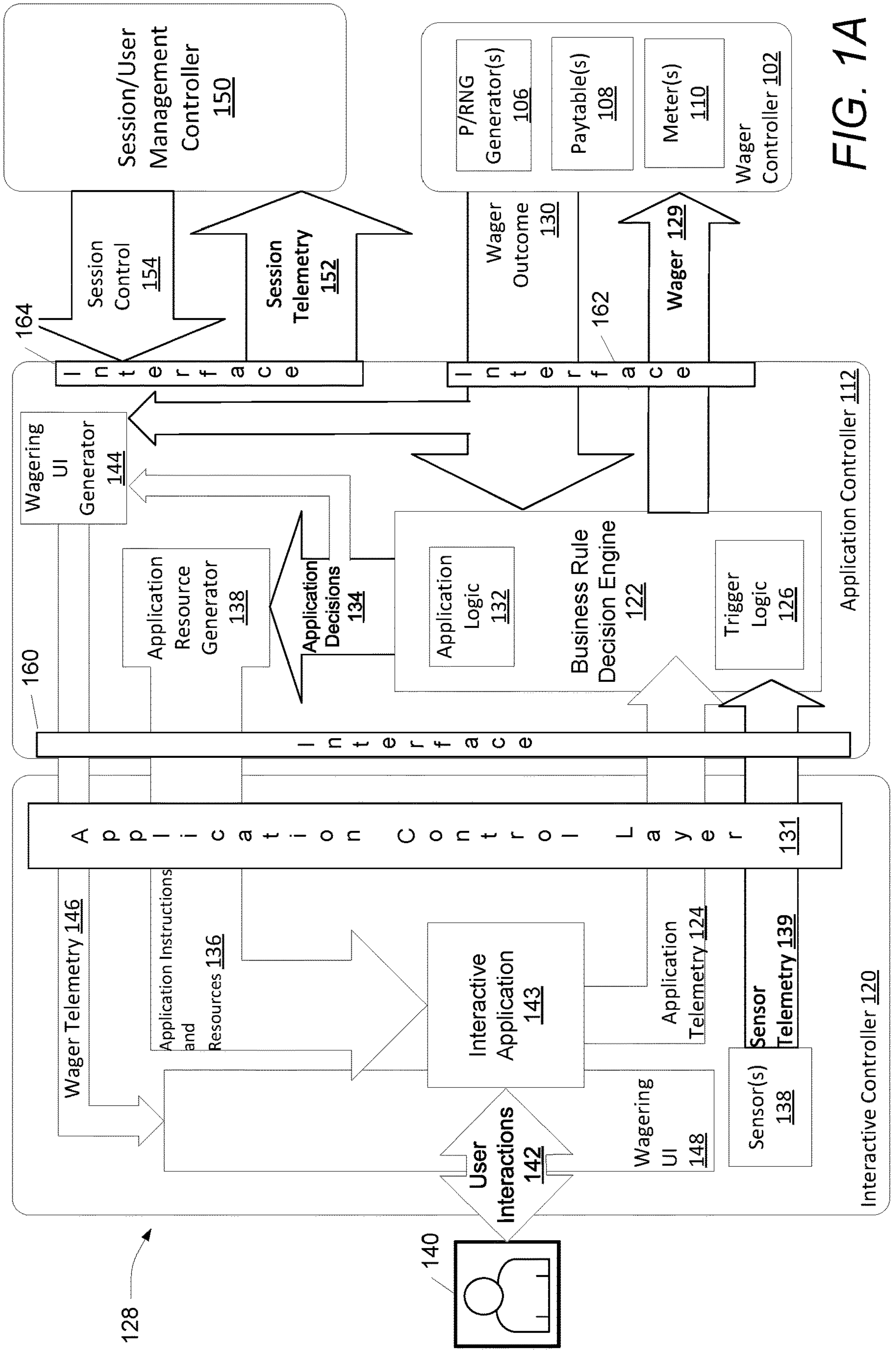
FIG. 1A is a diagram of a structure of a fungible object award interleaved wagering system in accordance with various embodiments of the invention.

A fungible object award interleaved wagering system interleaves wagering with non-wagering activities. In some embodiments of a fungible object award interleaved wagering system an interactive application executed by an interactive controller provides non-wagering components of the fungible object award interleaved wagering system. The interactive controller is operatively connected to an application controller that manages and configures the interactive application of the interactive controller and determines when wagers should be interleaved with the operations of the interactive application. The application controller is further operatively connected to a wager controller that provides one or more wagering propositions for one or more wagers.

In some embodiments, the interactive controller also includes a wagering user interface that is used to display data about a wagering process, including but not limited a wager outcome of a wager made in accordance with a wagering proposition. The content of the wagering user interface is controlled by the application controller and includes content provided by the wager controller.

In several embodiments, a user or user interactions are represented in a fungible object award interleaved wagering system by the electronic representation of interactions between the user and the interactive application, typically received via a user interface of the interactive application, and a user profile of the fungible object award interleaved wagering system associated with the user.

Many different types of interactive applications may be utilized with the fungible object award interleaved wagering system. In some embodiments, the interactive application reacts to the physical activity of the user. In these embodiments, the user interacts with the interactive application through one or more sensors that monitor the user's physical activities. Such sensors may include, but are not limited to, physiological sensors that monitor the physiology of the user, environmental sensors that monitor the physical environment of the user, accelerometers that monitor changes in motion of the user, and location sensors that monitor the location of the user such as global positioning sensors.

In some embodiments, the interactive application is a skill-based interactive game that is played by the user.

In some embodiments, the interactive application is a tool used by the user to achieve some useful goal.

In operation, a user interacts with the interactive application using various types of elements of the interactive application in an interactive application environment. Elements are interactive application resources utilized by the user within the interactive application environment to provide an interactive experience for the user. Wagers of credits are made in accordance with a wagering proposition as triggered by the user's use of one or more of the elements of the interactive application. Wager outcomes of wagers of credits made in accordance with the wagering proposition can cause consumption, loss or accrual of credits.

In accordance with some embodiments, wager outcomes of wagering events can influence elements in the interactive application such as, but not limited to, providing one or more new elements, restoring one or more consumed elements, causing the loss of one or more elements, and restoration or placement of one or more fixed elements.

In various embodiments, the wagers may be made using one or more credits (Cr).

In some embodiments, Cr can be one or more credits that are purchased using, and redeemed in, a real world currency having a real world value.

In many embodiments, Cr can be one or more credits in a virtual currency. Virtual currency is an alternate currency that can be acquired, purchased or transferred by or to a user, but does not necessarily directly correlate to a real world currency. In many such embodiments, Cr in a virtual currency are allowed to be purchased using a real world currency but are prevented from being redeemed in a real world currency having a real world value.

In several embodiments, during interaction with the interactive application using the elements, a user can optionally consume and/or accrue application environment credit (AC) within the interactive application as a result of the user's use of the interactive application. AC can be in the form of, but is not limited to, application environment credits, experience points, and points generally.

In various embodiments, when the interactive application is a skill-based interactive game, AC is awarded to a player of the skill-based interactive game on the basis of the player's skillful play of the skill-based interactive game. In such embodiments, AC may be analogous to the score in a typical video game. The skill-based interactive game can have one or more scoring criteria, embedded within an application controller and/or an interactive controller that provides the skill-based interactive game, that reflect user performance against one or more goals of the skill-based interactive game.

In many embodiments, AC can be used to purchase in-application items, including but not limited to, application elements that have particular properties, power ups for existing items, and other item enhancements.

In some embodiments, AC may be used to earn entrance into a sweepstakes drawing, to earn entrance in a tournament with prizes, to score in the tournament, and/or to participate and/or score in any other game event.

In several embodiments, AC can be stored on a user-tracking card or in a network-based user tracking system where the AC is attributed to a specific user.

In many embodiments, a wagering proposition includes a wager of AC for a wager outcome of a randomly generated payout of interactive application AC, elements, and/or objects in accordance with a wagering proposition.

In a number of embodiments, a wager of an amount of Cr results in a wager outcome of a payout of AC, elements, and/or objects that have an Cr value if cashed out.

In some embodiments, in a case that an interactive application is a skill-based interactive game, interactive application objects include in-application objects that may be used by a player of the skill-based interactive game to enhance the player's gameplay of the skill-based interactive game. Such objects include, but are not limited to, power-ups, enhanced in-application items, and the like. In some embodiments, the interactive application objects include objects that are detrimental to the player's play of the skill-based interactive game such as, but not limited to, obstructions in the game space, a temporary player handicap, an enhanced opponent, and the like.

In some embodiments, elements in an interactive application include, but are not limited to, enabling elements (EE) that are interactive application environment resources utilized during the user's use of the interactive application and whose utilization by the user while using the interactive application triggers execution of a wager in accordance with a wagering proposition. In another embodiment, elements in an interactive application include, but are not limited to, a reserve enabling element (REE), that is an element that converts into one or more enabling elements upon occurrence of a release event during an interactive user session. In yet another embodiment, elements in an interactive application include, but are not limited to, an actionable element (AE) that is an element that is acted upon during use of the interactive application to trigger a wager in accordance with a wagering proposition and may or may not be restorable during normal play of the interactive application. In yet another embodiment, elements in an interactive application include, but are not limited to, a common enabling element (CEE) that is an element that may be shared by two or more users and causes a wagering event and associated wager to be triggered in accordance with the wagering proposition when used by one of the users during use of the interactive application. In some embodiments, in progressing through interactive application use, a user can utilize elements during interactions with a controlled entity (CE). A CE is a character, entity, inanimate object, device or other object under control of a user.

In accordance with some embodiments of a fungible object award interleaved wagering system, the triggering of the wagering event and/or wager can be dependent upon an interactive application environment variable such as, but not limited to, a required object (RO), a required environmental condition (REC), or a controlled entity characteristic (CEC). A RO is a specific interactive application object in an interactive application acted upon for an AE to be completed. A non-limiting example of an RO is a specific key needed to open a door. An REC is an interactive application state present within an interactive application for an AE to be completed. A non-limiting example of an REC is daylight whose presence enables a character to walk through woods. A CEC is a status of the CE within an interactive application for an AE to be completed. A non-limiting example of a CEC is requirement that a CE have full health points before entering battle. Although various interactive application resources such as, but not limited to, the types of interactive application elements as discussed herein may be used to trigger a wager in accordance with a wagering proposition, one skilled in the art will recognize that any interactive application resource can be utilized in a fungible object award interleaved wagering system to trigger of a wager as appropriate to the specification of a specific application in accordance with various embodiments of the invention.

In several embodiments, a fungible object award interleaved wagering system can utilize an application controller to monitor use of the interactive application executed by an interactive controller for detecting a trigger of a wagering event. The trigger for the wagering event can be detected by the application controller from the utilization of the interactive application in accordance with at least one wagering event occurrence rule. The trigger of the wagering event can be communicated to a wager controller. In response to notification of the trigger, the wager controller executes a wager in accordance with a wagering proposition. In addition, use of an interactive application in a fungible object award interleaved wagering system can be modified by the application controller based upon the wager outcome.

In several embodiments, a wagering event occurrence can be determined from one or more application environment variables within an interactive application that are used to trigger a wager and/or associated wager in accordance with a wagering proposition. Application environment variables can include, but are not limited to, passage of a period of time during fungible object award interleaved wagering system interactive application use, a result from a fungible object award interleaved wagering system interactive application user session (such as, but not limited to, achieving a goal or a particular score), a user action that is a consumption of an element, or a user action that achieves a combination of elements to be associated with a user profile.

In numerous embodiments, an interactive application instruction is an instruction to an interactive controller and/or an interactive application to modify an interactive application state or modify one or more interactive application resources. In some embodiments, the interactive application instructions may be based upon one or more of a wager outcome and application environment variables. An interactive application instruction can modify any aspect of an interactive application, such as, but not limited to, an addition of a period of time available for a current interactive application user session for the interactive application of fungible object award interleaved wagering system, an addition of a period of time available for a future fungible object award interleaved wagering system interactive application user session or any other modification to the interactive application elements that can be utilized during interactive application use. In some embodiments, an interactive application instruction can modify a type of element whose consumption triggers a wagering event occurrence. In many embodiments, an interactive application instruction can modify a type of element whose consumption is not required in a wagering event occurrence.

In a number of embodiments, a user interface can be utilized that depicts a status of the interactive application in the fungible object award interleaved wagering system. A user interface can depict any aspect of an interactive application including, but not limited to, an illustration of fungible object award interleaved wagering system interactive application use advancement as a user uses the fungible object award interleaved wagering system.

In some embodiments, a fungible object award interleaved wagering system including an application controller operatively connected to a wager controller and operatively connected to an interactive controller may provide for interleaving entertainment content from an interactive application. The fungible object award interleaved wagering system provides for random wager outcomes in accordance with the wagering proposition that are independent of user skill while providing an interactive experience to the user that may be shaped by the user's skill.

In several embodiments, an application controller of a fungible object award interleaved wagering system may provide for a communications interface for asynchronous communications between a wager controller and an interactive application provided by an interactive controller, by operatively connecting the interactive controller, and thus the interactive controller's interactive application, with the wager controller. In some embodiments, asynchronous communications provided for by a fungible object award interleaved wagering system may reduce an amount of idle waiting time by an interactive controller of the fungible object award interleaved wagering system, thus increasing an amount of processing resources that the interactive controller may provide to an interactive application or other processes of the interactive controller. In many embodiments, asynchronous communications provided for by a fungible object award interleaved wagering system reduces an amount of idle waiting time by a wager controller, thus increasing an amount of processing resources that the wager controller may provide to execution of wagers to determine wager outcomes, and other processes provided by the wager controller. In some embodiments, a wager controller of a fungible object award interleaved wagering system may be operatively connected to a plurality of interactive controllers through one or more application controllers and the asynchronous communications provided for by the one or more application controllers allows the wager controller to operate more efficiently and provide wager outcomes to a larger number of interactive controllers than would be achievable without the one or more application controllers of the fungible object award interleaved wagering system.

In some embodiments, a fungible object award interleaved wagering system including an application controller operatively connected to a wager controller and operatively connected to an interactive controller may provide for simplified communication protocols for communications of the interactive controller as the interactive controller may communicate user interactions with an interactive application provided by the interactive controller to the application controller without regard to a nature of a wagering proposition to be interleaved with processes of the interactive application.

In various embodiments, a fungible object award interleaved wagering system including an application controller operatively connected to a wager controller and operatively connected to an interactive controller may provide for simplified communication protocols for communications of the wager controller as the wager controller may receive wager requests and communicate wager outcomes without regard to a nature of an interactive application provided by the interactive controller.

Various types of interleaved wagering systems are discussed in Patent Cooperation Treaty Application No. PCT/US11/26768, filed Mar. 1, 2011, Patent Cooperation Treaty Application No. PCT/US11/63587, filed Dec. 6, 2011, and Patent Cooperation Treaty Application No. PCT/US12/58156, filed Sep. 29, 2012, the contents of each of which are hereby incorporated by reference in their entirety.

Fungible Object Award Wagering Interleaved Systems

FIG. 1A is a diagram of a structure of a fungible object award interleaved wagering system in accordance with various embodiments of the invention. The fungible object award interleaved wagering system 128 includes an interactive controller 120, an application controller 112, and a wager controller 102. The interactive controller 120 is operatively connected to, and communicates with, the application controller 112. The application controller 112 is also operatively connected to, and communicates with, the wager controller 102.

In several embodiments, the wager controller 102 is a controller for providing one or more wagering propositions provided by the fungible object award interleaved wagering system 128 and executes wagers in accordance with the wagering propositions. Types of value of a wager can be one or more of several different types. Types of value of a wager can include, but are not limited to, a wager of an amount of Cr corresponding to a real currency or a virtual currency, a wager of an amount of AC earned by the player through use of an interactive application, a wager of an amount of elements of an interactive application, and a wager of an amount of objects used in an interactive application. A wager outcome determined for a wager in accordance with a wagering proposition can increase or decrease an amount of the type of value used in the wager, such as, but not limited to, increasing an amount of Cr for a wager of Cr. In various embodiments, a wager outcome determined for a wager in accordance with a wagering proposition can increase or decrease an amount of a type of value that is different than a type of value of the wager, such as, but not limited to, increasing an amount of an object of an interactive application for a wager of Cr.

In many embodiments, the wager controller 120 includes one or more pseudo random or random number generators (P/RNG) 106 for generating random results, one or more paytables 108 for determining a wager outcome from the random results, and one or more credit or value meters 110 for storing amounts of wagered and won credits.

The one or more P/RNG generators 106 execute processes that can generate random or pseudo random results. The one or more paytables 108 are tables that can be used in conjunction with the random or pseudo random results to determine a wager outcome including an amount of Cr, AC, elements or objects won as a function of fungible object award interleaved wagering system use. There can be one or more paytables 108 in the wager controller 102. The paytables 108 are used to implement one or more wagering propositions in conjunction with a random output of the random or pseudo random results.

In some embodiments, selection of a paytable to use to execute a wager can be based on factors including, but not limited to, interactive application progress a user has achieved through use of the interactive application, user identification, and eligibility of the user for bonus rounds.

In various embodiments, the interactive controller 120 provides an interactive application 143 and provides human input devices (HIDs) and output devices for interacting with the user 140. The interactive controller 120 provides for user interactions 142 with the interactive application 143 by receiving input from a user through the HIDs and providing outputs such as video, audio and/or other sensory output to the user using the output devices.

The interactive controller 120 is operatively connected to, and communicates with, the application controller 112. The interactive controller communicates application telemetry data 124 to the application controller 112 and receives application instructions and resources 136 from the application controller 112. Via the communication of application instructions and resources 136, the application controller 112 can communicate certain interactive application resources including control parameters to the interactive application 143 to affect the interactive application's execution by the interactive controller 120. In various embodiments, these interactive application control parameters can be based on a wager outcome of a wager that was triggered by an element in the interactive application being utilized or acted upon by the user.

In some embodiments, execution of the interactive application by the interactive controller 120 communicates user interactions with the interactive application to the application controller 112. The application telemetry data 124 includes, but is not limited to, the user's utilization of the elements in the interactive application.

In some embodiments, the interactive application 143 is a skill-based interactive game. In such embodiments, execution of the skill-based interactive game by the interactive controller 120 is based on the user's skillful play of the skill-based interactive game. The interactive controller 120 can also communicate user choices made in the skill-based interactive game to the application controller 112 included in the application telemetry data 124 such as, but not limited to, the user's utilization of the elements of the skill-based interactive game during the user's skillful play of the skill-based interactive game. In such an embodiment, the application controller is interfaced to the interactive controller 120 in order to allow the coupling of the skill-based interactive game to wagers made in accordance with a wagering proposition.

In some embodiments, the interactive controller 120 includes one or more sensors 138 that sense various aspects of the physical environment of the interactive controller 120. Examples of sensors include, but are not limited to: global positioning sensors (GPSs) for sensing communications from a GPS system to determine a position or location of the interactive controller; temperature sensors; accelerometers; pressure sensors; and the like. Sensor telemetry data 128 is communicated by the interactive controller to the application controller 112. The application controller 112 receives the sensor telemetry data 128 and uses the sensor telemetry data to make wager decisions.

In many embodiments, the interactive controller includes a wagering user interface 148 used to display wagering data to the user.

In various embodiments, an application control layer 131 resident in the interactive controller 120 provides an interface between the interactive controller 120 and the application controller 112. The application control layer 131 implements an interactive controller to application controller communication protocol employing a device-to-device communication protocol In some embodiments, the application controller 112 includes an interactive controller interface 160 to an interactive controller. The interactive controller interface 160 provides for the communication of data between the interactive controller and the application controller, including but not limited to wager telemetry data 146, application instructions and resources 136, application telemetry data 124, and sensor telemetry data 128.

In many embodiments, application controller 112 provides an interface between the interactive application 143 provided by the interactive controller 120 and a wagering proposition provided by the wager controller 102.

In various embodiments, the application controller 112 includes a wager controller interface 162 to a wager controller. The wager controller interface 162 provides for communication of data between the application controller 112 and the wager controller, including but not limited to wager outcome data 130 and wager data 129.

In some embodiments, the application controller 112 includes a user management and session controller interface 164 to a user management and session controller. The user management and session controller interface 164 provides for communication of data between the application controller 112 and the user management and session controller, including but not limited to user session control data 154 and user session telemetry data 152.

The application controller 112 includes a business rule decision engine 122 that receives telemetry data, such as application telemetry data 124 and sensor telemetry data 128, from the interactive controller 120. The business rule decision engine 122 uses the telemetry data, along with trigger logic 126 to generate wager data 129 used to trigger a wager in the wager controller 102.

In some embodiments, the application telemetry data 124 includes, but is not limited to, application environment variables that indicate the state of the interactive application 143 being used by a user 140, interactive controller data indicating the state of the interactive controller, and user actions and interactions 142 between the user and the interactive application 143 provided by the interactive controller 120. The wagering and/or wager data 129 may include, but is not limited to, an amount and type of the wager, a trigger of the wager, and a selection of a paytable 108 to be used when executing the wager.

In some embodiments, the business rule decision engine 122 also receives wager outcome data 130 from the wager controller 102. The decision engine 122 uses the wager outcome data 130, in conjunction with the telemetry data and application logic 132 to generate application decisions 134 communicated to an application resource generator 138. The application resource generator 138 receives the application decisions and uses the application decisions to generate application instructions and application resources 136 to be communicated to the interactive application 143.

In many embodiments, the application controller 112 includes a pseudo random or random result generator used to generate random results that are communicated to the application resource generator 138. The application resource generator 138 uses the random results to generate application instructions and application resources 136 to be communicated to the interactive application 143.

In various embodiments, the business rule decision engine 122 also determines an amount of AC to award to the user 140 based at least in part on the user's use of the interactive application of the fungible object award interleaved wagering system as determined from the application telemetry data 124. In some embodiments, wager outcome data 130 may also be used to determine the amount of AC that should be awarded to the user.

In numerous embodiments, the interactive application is a skill-based interactive game and the AC is awarded to the user for the user's skillful play of the skill-based interactive game.

In some embodiments, the application decisions 134 and wager outcome data 130 are communicated to a wagering user interface generator 144. The wagering user interface generator 144 receives the application decisions 134 and wager outcome data 130 and generates wager telemetry data 146 describing the state of wagering and credit accumulation and loss for the fungible object award interleaved wagering system. In some embodiments, the wager telemetry data 146 may include, but is not limited to, amounts of AC and elements earned, lost or accumulated by the user through use of the interactive application as determined from the application decisions, and Cr amounts won, lost or accumulated as determined from the wager outcome data 130 and the one or more meters 110.

In some embodiments, the wager outcome data 130 also includes data about one or more game states of a gambling game executed in accordance with a wagering proposition by the wager controller 102. In various such embodiments, the wagering user interface generator 144 generates a gambling game process display and/or gambling game state display using the one or more game states of the gambling game. The gambling game process display and/or gambling game state display is included in the wager telemetry data 146 that is communicated to the interactive controller 120. The gambling game process display and/or a gambling game state display is displayed by the wagering user interface 148 to the user 140. In other such embodiments, the one or more game states of the gambling game are communicated to the interactive controller 120 and the wagering user interface 148 generates the gambling game process display and/or gambling game state display using the one or more game states of the gambling game for display to the user 140.

The application controller 112 can further operatively connect to the wager controller 102 to determine an amount of credit or elements available and other wagering metrics of a wagering proposition. Thus, the application controller 112 may potentially affect an amount of Cr in play for participation in the wagering events of a wagering game provided by the wager controller 102 in some embodiments. The application controller 112 may additionally include various audit logs and activity meters. In some embodiments, the application controller 112 can also couple to a centralized server for exchanging various data related to the user and the activities of the user during game play of a fungible object award interleaved wagering system.

In many embodiments, one or more users can be engaged in using the interactive application executed by the interactive controller 120. In various embodiments, a fungible object award interleaved wagering system can include an interactive application that provides a skill-based interactive game that includes head-to-head play between a single user and a computing device, between two or more users against one another, or multiple users playing against a computer device and/or each other. In some embodiments, the interactive application can be a skill-based interactive game where the user is not skillfully playing against the computer or any other user such as skill-based interactive games where the user is effectively skillfully playing against himself or herself.

In some embodiments, the operation of the application controller 112 does not affect the provision of a wagering proposition by the wager controller 102 except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In various embodiments, wager outcome data 130 communicated from the wager controller 102 can also be used to convey a status operation of the wager controller 102.

In a number of embodiments, communication of the wager data 129 between the wager controller 102 and the application controller 112 can further be used to communicate various wagering control factors that the wager controller 102 uses as input. Examples of wagering control factors include, but are not limited to, an amount of Cr, AC, elements, or objects consumed per wagering event, and/or the user's election to enter a jackpot round.

In some embodiments, the application controller 112 utilizes the wagering user interface 148 to communicate certain interactive application data to the user, including but not limited to, club points, user status, control of the selection of choices, and messages which a user can find useful in order to adjust the interactive application experience or understand the wagering status of the user in accordance with the wagering proposition in the wager controller 102.

In some embodiments, the application controller 112 utilizes the wagering user interface 148 to communicate aspects of a wagering proposition to the user including, but not limited to, odds of certain wager outcomes, amount of Cr, AC, elements, or objects in play, and amounts of Cr, AC, elements, or objects available.

In a number of embodiments, the wager controller 102 can accept wager proposition factors including, but not limited to, modifications in the amount of Cr, AC, elements, or objects wagered on each individual wagering event, a number of wagering events per minute the wager controller 102 can resolve, entrance into a bonus round, and other factors. An example of a varying wager amount that the user can choose can include, but is not limited to, using a more difficult interactive application level associated with an amount of a wager. These factors can increase or decrease an amount wagered per individual wagering proposition in the same manner that a standard slot machine player can decide to wager more or less credits for each pull of the handle. In several embodiments, the wager controller 102 can communicate a number of factors back and forth to the application controller 112, via an interface, such that an increase/decrease in a wagered amount can be related to the change in user profile of the user in the interactive application. In this manner, a user can control a wager amount per wagering event in accordance with the wagering proposition with the change mapping to a parameter or component that is applicable to the interactive application experience.

In some embodiments, a user management and session controller 150 is used to authorize a fungible object award interleaved wagering system user session. The user management and session controller receives game user session data 152, that may include, but is not limited to, user, interactive controller, application controller and wager controller data from the application controller 112. The user management and session controller 150 uses the user, interactive controller, application controller and wager controller data to regulate a fungible object award interleaved wagering system user session. In some embodiments, the user management and session controller may also assert control of a fungible object award interleaved wagering system game user session 154. Such control may include, but is not limited to, ending a fungible object award interleaved wagering system game user session, initiating wagering in a fungible object award interleaved wagering system game user session, ending wagering in a fungible object award interleaved wagering system game user session but not ending a user's play of the interactive application portion of the fungible object award interleaved wagering system game, and changing from real credit wagering in a fungible object award interleaved wagering system to virtual credit wagering, or vice versa.

In many embodiments, the user management and session controller 150 manages user profiles for a plurality of users. The user management and session controller 150 stores and manages data about users in order to provide authentication and authorization of users of the fungible object award interleaved wagering system 128. In some embodiments, the user management and session controller 150 also manages geolocation information to ensure that the fungible object award interleaved wagering system i128 is only used by users in jurisdictions were gaming is approved. In various embodiments, the user management and session controller 150 stores application credits that are associated with the user's use of the interactive application of the fungible object award interleaved wagering system 128.

In various embodiments, the application controller operates as an interface between the interactive controller and the wager controller. By virtue of this construction, the wager controller is isolated from the interactive controller allowing the interactive controller to operate in an unregulated environment will allowing the wager controller to operate in a regulated environment.

In some embodiments, a single wager controller may provide services to two or more interactive controllers and/or two or more application controllers, thus allowing a fungible object award interleaved wagering system to operate over a large range of scaling.

In various embodiments, multiple types of interactive controllers using different operating systems may be interfaced to a single type of application controller and/or wager controller without requiring customization of the application controller and/or the wager controller.

In many embodiments, an interactive controller may be provided as a user device under control of a user while maintaining the wager controller in an environment under the control of a regulated operator of wagering equipment.

In several embodiments, data communicated between the controllers may be encrypted to increase security of the fungible object award interleaved wagering system.

In some embodiments, the application controller isolates trigger logic and application logic as unregulated logic from a regulated wager controller, thus allowing errors in the application logic and/or trigger logic to be corrected, new application logic and/or trigger logic to be used, or modifications to be made to the application logic and/or trigger logic without a need for regulatory approval.

In various embodiments, an interactive application may require extensive processing resources from an interactive controller leaving few processing resources for the functions performed by an application controller and/or a wager controller. By virtue of the architecture described herein, processing loads may be distributed across multiple devices such that operations of the interactive controller may be dedicated to the interactive application and the processes of the application controller and/or wager controller are not burdened by the requirements of the interactive application.

Distributed Fungible Object Award Interleaved Wager Systems

In many embodiments, a fungible object award interleaved wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like.

In some embodiments, one or more components of a fungible object award interleaved wagering system are distributed in close proximity to each other and communicate using a local area network and/or a communication bus. In several embodiments, an interactive controller and an application controller of a fungible object award interleaved wagering system are in a common location and communicate with an external wager controller. In some embodiments, an application controller and a wager controller of a fungible object award interleaved wagering system are in a common location and communicate with an external interactive controller. In many embodiments, an interactive controller, an application controller, and a wager controller of a fungible object award interleaved wagering system are located in a common location. In some embodiments, a user management and session controller is located in a common location with an application controller and/or a wager controller.

In various embodiments, these multiple devices can be constructed from or configured using a single server or a plurality of servers such that a fungible object award interleaved wagering system is executed as a system in a virtualized space such as, but not limited to, where a wager controller and an application controller are large scale centralized servers in the cloud operatively connected to widely distributed interactive controllers via a wide area network such as the Internet or a local area network. In such embodiments, the components of a fungible object award interleaved wagering system may communicate using a networking protocol or other type of device-to-device communications protocol.

In many embodiments, a centralized wager controller is operatively connected to, and communicates with, one or more application controllers using a communication link. The centralized wager controller can generate wager outcomes for wagers in accordance with one or more wagering propositions. The centralized wager controller can execute a number of simultaneous or pseudo-simultaneous wagers in order to generate wager outcomes for a variety of wagering propositions that one or more distributed fungible object award interleaved wagering systems can use.

In several embodiments, a centralized application controller is operatively connected to one or more interactive controllers and one or more wager controllers using a communication link. The centralized application controller can perform the functionality of an application controller across various fungible object award interleaved wagering systems.

In a variety of embodiments, management of user profile data can be performed by a user management and session controller operatively connected to, and communicating with, one or more application controllers, wager controllers and interactive controllers using a communication link. A user management and session controller can manage data related to a user profile. The managed data in the user profile may include, but is not limited to, data concerning controlled entities (characters) in interactive application use, user performance metrics for a type or class of interactive application, interactive application elements acquired by a user; Cr and AC associated with a particular user, and tournament reservations.

Although a user management and session controller is discussed as being separate from an application controller server, a centralized application controller server may also perform the functions of a user management and session controller in some embodiments.

In numerous embodiments, an interactive application server provides a host for managing head-to-head play operating over a network of interactive controllers connected to the interactive application server using a communication link. The interactive application server provides an environment where users can compete directly with one another and interact with other users.

Processing devices connected using a communication link to construct fungible object award interleaved wagering systems in accordance with many embodiments of the invention can communicate with each other to provide services utilized by a fungible object award interleaved wagering system. In several embodiments, a wager controller can communicate with an application controller using a communication link. In some embodiments, the wager controller can communicate with an application controller to communicate any type of data as appropriate for a specific application. Examples of the data that may be communicated include, but are not limited to, data used to configure the various simultaneous or pseudo simultaneous wager controllers executing in parallel within the wager controller to accomplish fungible object award interleaved wagering system functionalities; data used to determine metrics of wager controller performance such as wagers run and/or wager outcomes for tracking system performance; data used to perform audits and/or provide operator reports; and data used to request the results of a wager outcome for use in one or more function(s) operating within the application controller such as, but not limited to, automatic drawings for prizes that are a function of interactive controller performance.

In several embodiments, an application controller can communicate with an interactive application server using a communication link when the interactive application server is also communicating with one or more interactive controllers using a communication link. An application controller can communicate with an interactive application server to communicate any type of data as appropriate for a specific application. The data that may be communicated between an application controller and an interactive application server includes, but is not limited to, the data for management of an interactive application server by an application controller server during a fungible object award interleaved wagering system tournament. In an example embodiment, an application controller may not be aware of the relationship of the application controller to the rest of a tournament since the actual tournament play may be managed by the interactive application server. Therefore, management of a fungible object award interleaved wagering system can include, but is not limited to tasks including, but not limited to, conducting tournaments according to system programming that can be coordinated by an operator of the fungible object award interleaved wagering system; allowing entry of a particular user into a tournament; communicating the number of users in a tournament; and the status of the tournament (such as, but not limited to the amount of surviving users, the status of each surviving user within the game, and time remaining on the tournament); communicating the performance of users within the tournament; communicating the scores of the various users in the tournament; and providing a synchronizing link to connect the application controllers in a tournament with their respective interactive controllers.

In several embodiments, an application controller can communicate with a user management and session controller using a communication link. An application controller can communicate with a user management and session controller to communicate any type of data as appropriate for a specific application. Examples of data communicated between an application controller and a user management and session controller include, but are not limited to, data for configuring tournaments according to system programming conducted by an operator of a fungible object award interleaved wagering system; data for exchange of data used to link a user's user profile to an ability to participate in various forms of fungible object award interleaved wagering system use (such as but not limited to the difficulty of play set by the application controller server for an interactive application that is a skill-based interactive game); data for determining a user's ability to participate in a tournament as a function of a user's characteristics (such as but not limited to a user's prowess or other metrics used for tournament screening); data for configuring application controller and interactive controller performance to suit preferences of a user on a particular fungible object award interleaved wagering system; and data for determining a user's use and wagering performance for the purposes of marketing intelligence; and data for logging secondary drawing awards, tournament prizes, Cr and/or AC into the user profile.

In many embodiments, a fungible object award interleaved wagering system can be distributed across one of more processing devices, with the actual location of where various process are executed being located either on an end device (user management and session controller, wager controller, application controller, interactive controller), on servers (user management and session controller, wager controller, application controller, or interactive application server), or a combination of both end devices and servers. In a number of embodiments, certain functions of a wager controller, application controller, and/or interactive application server can operate on a local wager controller, local application controller and/or local interactive controller used to construct a fungible object award interleaved wagering system being provided locally on a device. In some embodiments, a controller or server can be part of a server system including multiple servers, where applications can be run on one or more physical devices. Similarly, in particular embodiments, multiple servers can be combined on a single physical device.

In many embodiments, a fungible object award interleaved wagering system can be distributed across one or more processing devices that are in close proximity to each other, such as a common enclosure. In such an embodiment, the one or more processing devices can be operatively connected using communication links that incorporate an interdevice communication protocol over a serial or parallel physical link.

Figure 1B:
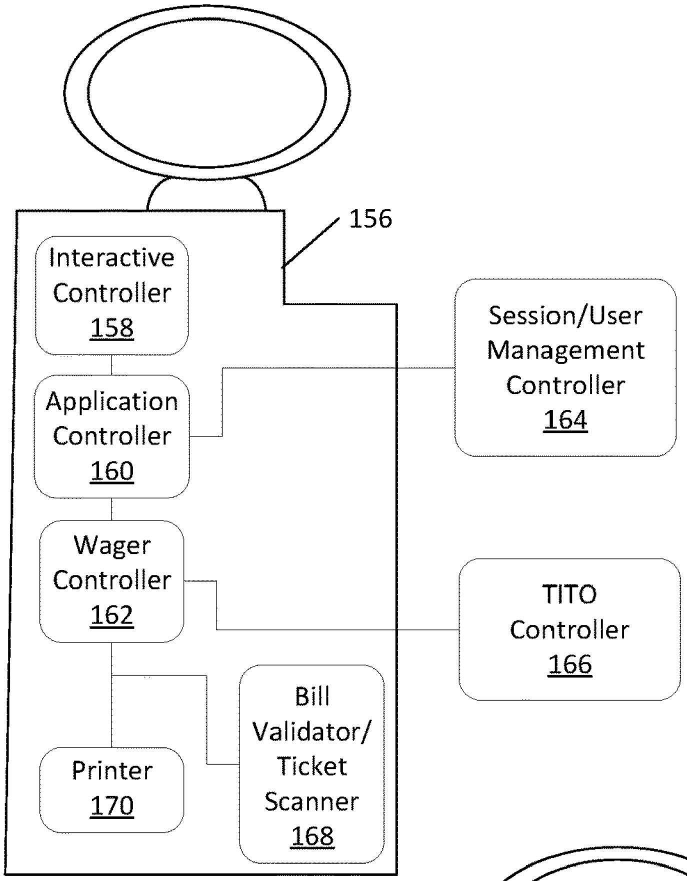
FIG. 1B is a diagram of a land-based configuration of a fungible object award interleaved wagering system in accordance with various embodiments of the invention.
Figure 1C:
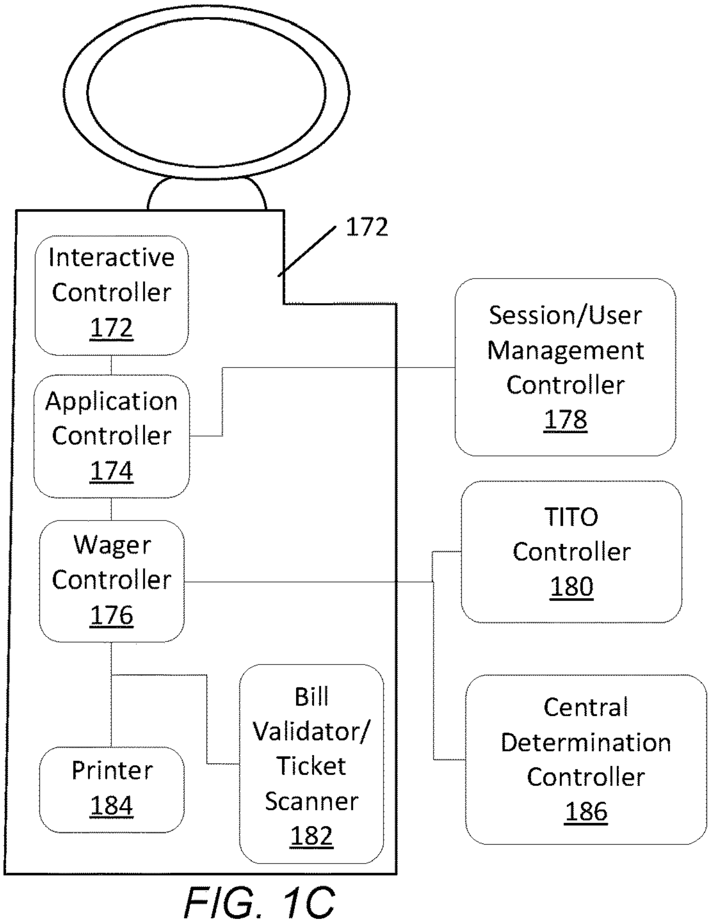
FIG. 1C is another diagram of a land-based configuration of a fungible object award interleaved wagering system in accordance with various embodiments of the invention.

FIG. 1B is a diagram of a land-based configuration of a fungible object award interleaved wagering system in accordance with various embodiments of the invention. Land-based configurations are suitable for deployment in a gaming establishment. A land-based configuration of a fungible object award interleaved wagering system 156 includes an interactive controller 158, an application controller 160 and a wager controller 162 housed in a common enclosure. The application controller 160 is operatively connected to an external session/user management controller 164. The wager controller 162 is operatively connected to a ticket-in-ticket-out (TITO) controller 166 or other type of credit controller. The wager controller 162 communicates with the TITO controller 166 to obtain amounts of credits used for wagering. In operation, the wager controller 162 uses a bill validator/ticket scanner 168 to scan a TITO ticket having indicia of credit account data of a credit account of the TITO controller 166. The wager controller 162 communicates the credit account data to the TITO controller 166. The TITO controller 166 uses the credit account data to determine an amount of credits to transfer to the wager controller 162. The TITO controller 166 communicates the amount of credits to the wager controller 162. The wager controller 162 credits the one or more credit meters with the amount of credits so that the credits can be used when a user makes wagers using the fungible object award interleaved wagering system 156. In addition, the wager controller 162 can use the TITO controller 166 along with a ticket printer 170 to generate a TITO ticket for a user. In operation, the wager controller 162 communicates an amount of credits for a credit account on the TITO controller 166. The TITO controller 166 receives the amount of credits and creates the credit account and credits the credit account with the amount of credits. The TITO controller 166 generates credit account data for the credit account and communicates the credit account data to the wager controller 162. The wager controller 162 uses the ticket printer 170 to print indicia of the credit account data onto a TITO ticket.

FIG. 1B is a diagram of another land-based configuration of a fungible object award interleaved wagering system in accordance with various embodiments of the invention. A land-based configuration of a fungible object award interleaved wagering system 172 includes an interactive controller 172, an application controller 174 and a wager controller 176 housed in a common enclosure. The application controller 174 is operatively connected to an external session/user management controller 178. The wager controller 176 is operatively connected to a ticket-in-ticket-out (TITO) controller 180 or other type of credit controller. The wager controller 176 communicates with the TITO controller 180 to obtain amounts of credits used for wagering. In operation, the wager controller 176 uses a bill validator/ticket scanner 182 to scan a TITO ticket having indicia of credit account data of a credit account of the TITO controller 180. The wager controller 176 communicates the credit account data to the TITO controller 180. The TITO controller 180 uses the credit account data to determine an amount of credits to transfer to the wager controller 176. The TITO controller 180 communicates the amount of credits to the wager controller 176. The wager controller 176 receives the amount of credits and credits the one or more credit meters with the amount of credits so that the credits can be used when a user makes wagers using the fungible object award interleaved wagering system 172. In addition, the wager controller 176 can use the TITO controller 180 along with a ticket printer 184 to generate a TITO ticket for a user. In operation, the wager controller 176 communicates an amount of credits for a credit account on the TITO controller 180. The TITO controller 180 receives the amount of credits and creates the credit account and credits the credit account with the amount of credits. The TITO controller 180 generates credit account data for the credit account and communicates the credit account data to the wager controller 176. The wager controller 176 uses the ticket printer 184 to print indicia of the credit account data onto a TITO ticket.

The wager controller 176 is operatively connected to a central determination controller 186. In operation, when the wager controller 176 needs to determine a wager outcome, the wager controller communicates a request to the central determination controller 186 for the wager outcome. The central determination controller 186 receives the wager outcome request and generates a wager outcome in response to the wager request. The central determination controller 186 communicates the wager outcome to the wager controller 176. The wager controller 176 receives the wager outcome and utilizes the wager outcome as described herein. In some embodiments, the wager outcome is drawn from a pool of pre-determined wager outcomes. In some embodiments, the wager outcome is a pseudo random result or random result that is utilized by the wager controller along with paytables to determine a wager outcome as described herein.

Figure 1D:
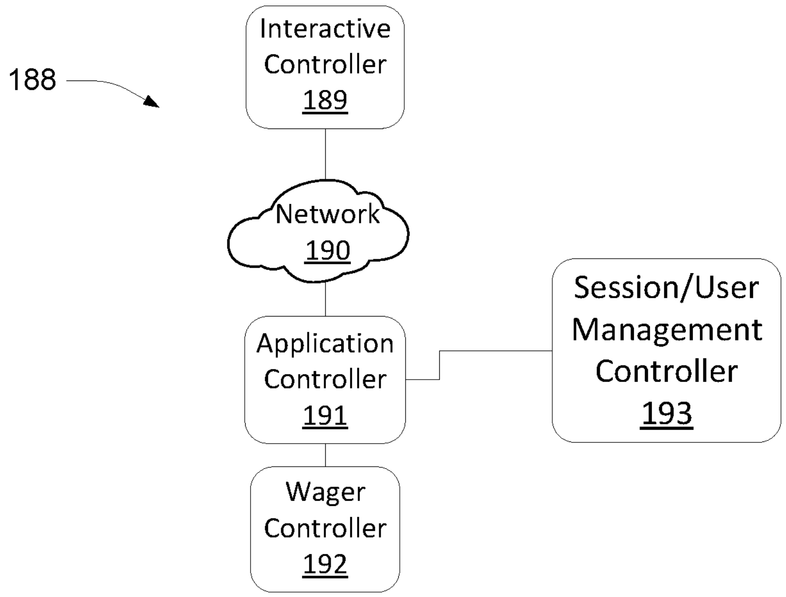
FIG. 1D is a diagram of an interactive configuration of a fungible object award interleaved wagering system in accordance with various embodiments of the invention.

FIG. 1D is a diagram of an interactive configuration of a fungible object award interleaved wagering system in accordance with various embodiments of the invention. An interactive configuration of a fungible object award interleaved wagering system is useful for deployment over a wide area network such as an internet. An interactive configuration of a fungible object award interleaved wagering system 188 includes an interactive controller 189 operatively connected by a network 190 to an application controller 191, and a wager controller 192. The application controller 191 is operatively connected to a session/user management controller 193.

Figure 1E:
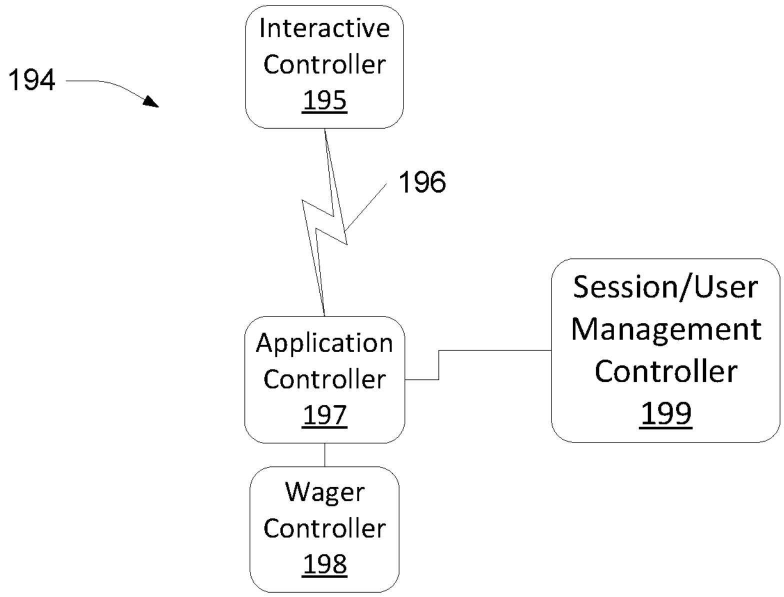
FIG. 1E is a diagram of a mobile configuration of a fungible object award interleaved wagering system in accordance with various embodiments of the invention.

FIG. 1E is a diagram of a mobile configuration of a fungible object award interleaved wagering system in accordance with various embodiments of the invention. A mobile configuration of a fungible object award interleaved wagering system is useful for deployment over wireless communication network, such as a wireless local area network or a wireless telecommunications network. An interactive configuration of a fungible object award interleaved wagering system 194 includes an interactive controller 195 operatively connected by a wireless network 196 to an application controller 197, and a wager controller 198. The application controller 197 is also operatively connected to a session/user management controller 199.

FIGS. 2A, 2B, 2C, and 2D are illustrations of interactive controllers of a fungible object award interleaved wagering system in accordance with various embodiments of the invention. An interactive controller, such as interactive controller 120 of FIG. 1A, may be constructed from or configured using one or more processing devices configured to perform the operations of the interactive controller. An interactive controller in a fungible object award interleaved wagering system may be constructed from or configured using any processing device having sufficient processing and communication capabilities that may be configured to perform the processes of an interactive controller in accordance with various embodiments of the invention. In some embodiments, the construction or configuration of the interactive controller may be achieved through the use of an application control layer, such as application control layer 131 of FIG. 1A, and/or through the use of an interactive application, such as interactive application 143 of FIG. 1A.

Figure 2A:
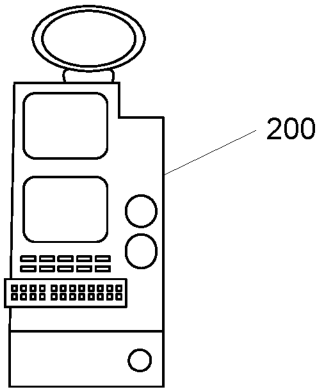
FIGS. 2A, 2B, 2C, and 2D are illustrations of interactive controllers of a fungible object award interleaved wagering system in accordance with various embodiments of the invention.

In some embodiments, an interactive controller may be constructed from or configured using an electronic gaming machine 200 as shown in FIG. 2A. The electronic gaming machine 200 may be physically located in various types of gaming establishments.

Figure 2B:
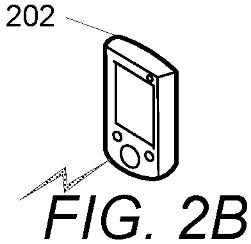

In many embodiments, an interactive controller may be constructed from or configured using a portable device 202 as shown in FIG. 2B. The portable device 202 is a device that may wirelessly connect to a network. Examples of portable devices include, but are not limited to, a tablet computer, a personal digital assistant, and a smartphone.

Figure 2C:
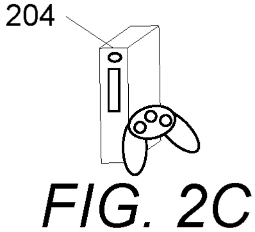

In some embodiments, an interactive controller may be constructed from or configured using a gaming console 204 as shown in FIG. 2C.

Figure 2D:
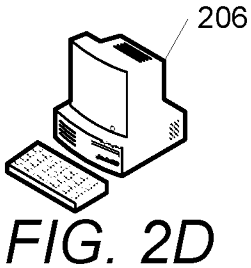

In various embodiments, an interactive controller may be constructed from or configured using a personal computer 206 as shown in FIG. 2D.

In some embodiments, a device, such as the devices of FIGS. 2A, 2B, 2C, and 2D, may be used to construct a complete fungible object award interleaved wagering system and may be operatively connected using a communication link to a session and/or user management controller, such as session and/or user management controller 150 of FIG. 1A.

Figure 3A:
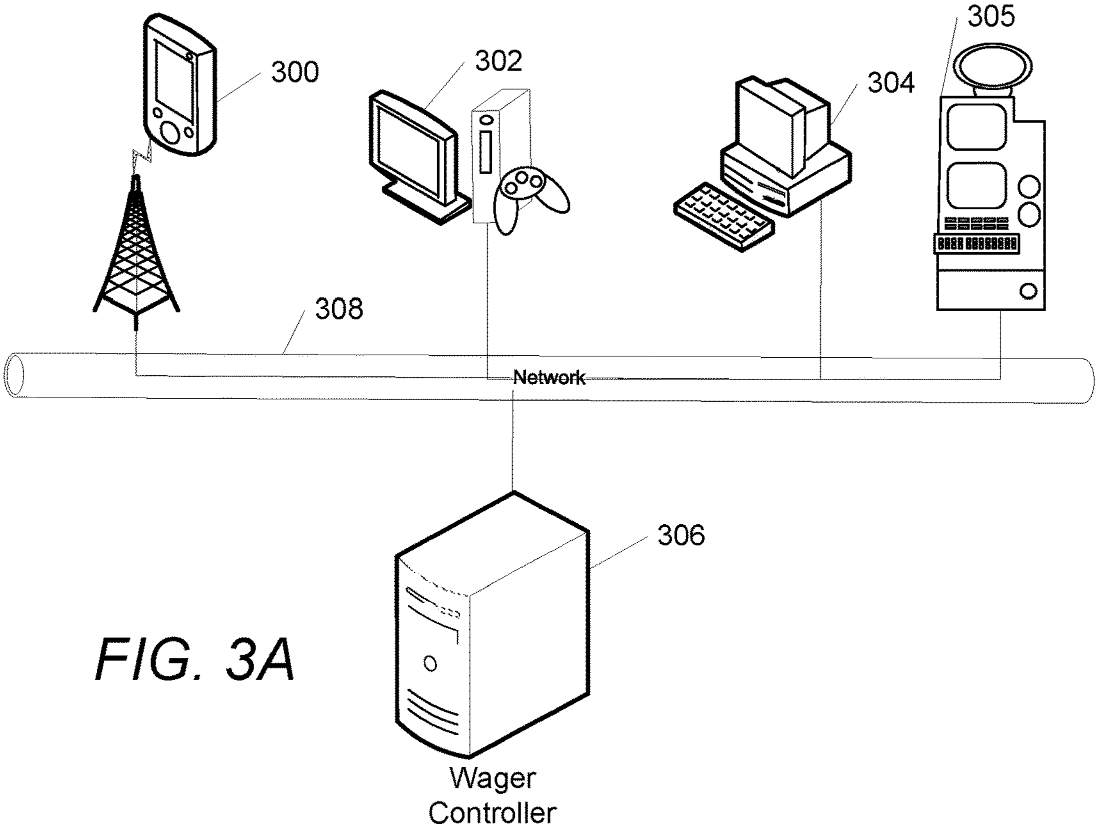
FIGS. 3A, 3B and 3C are diagrams of distributed fungible object award interleaved wagering systems in accordance with various embodiments of the invention.
Figure 3B:
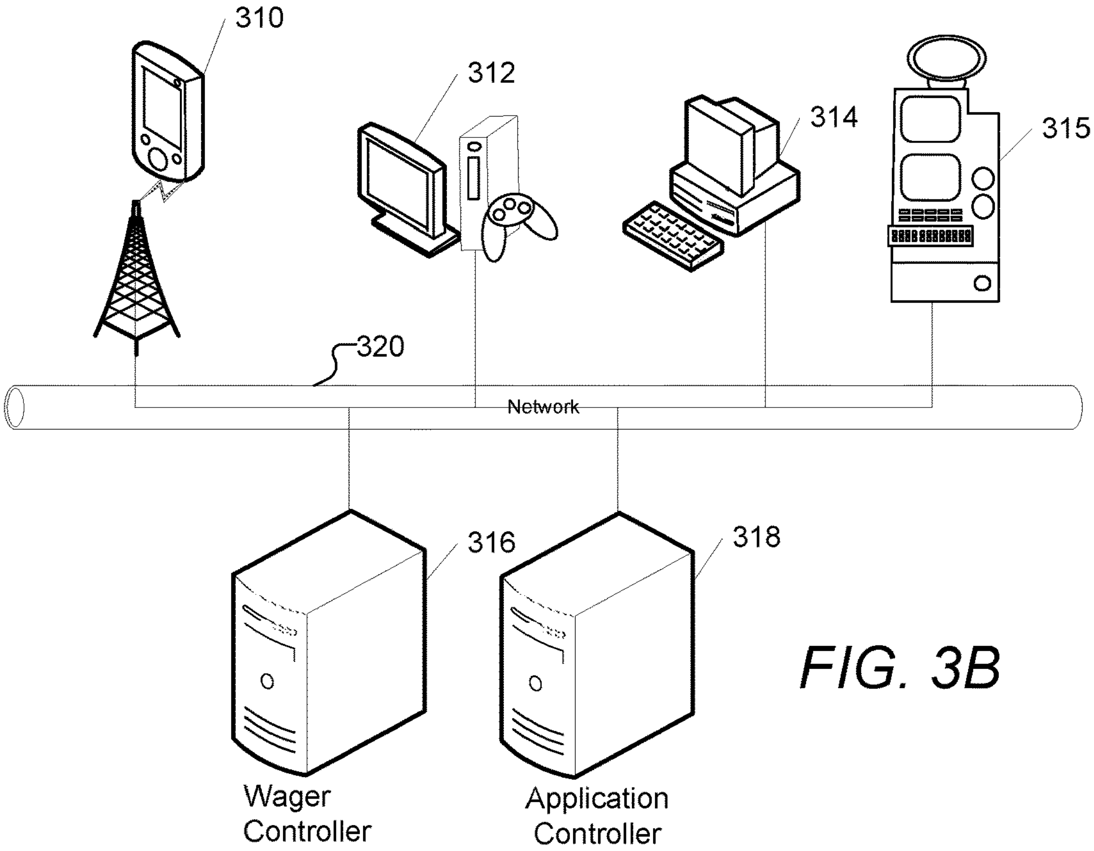
Figure 3C:
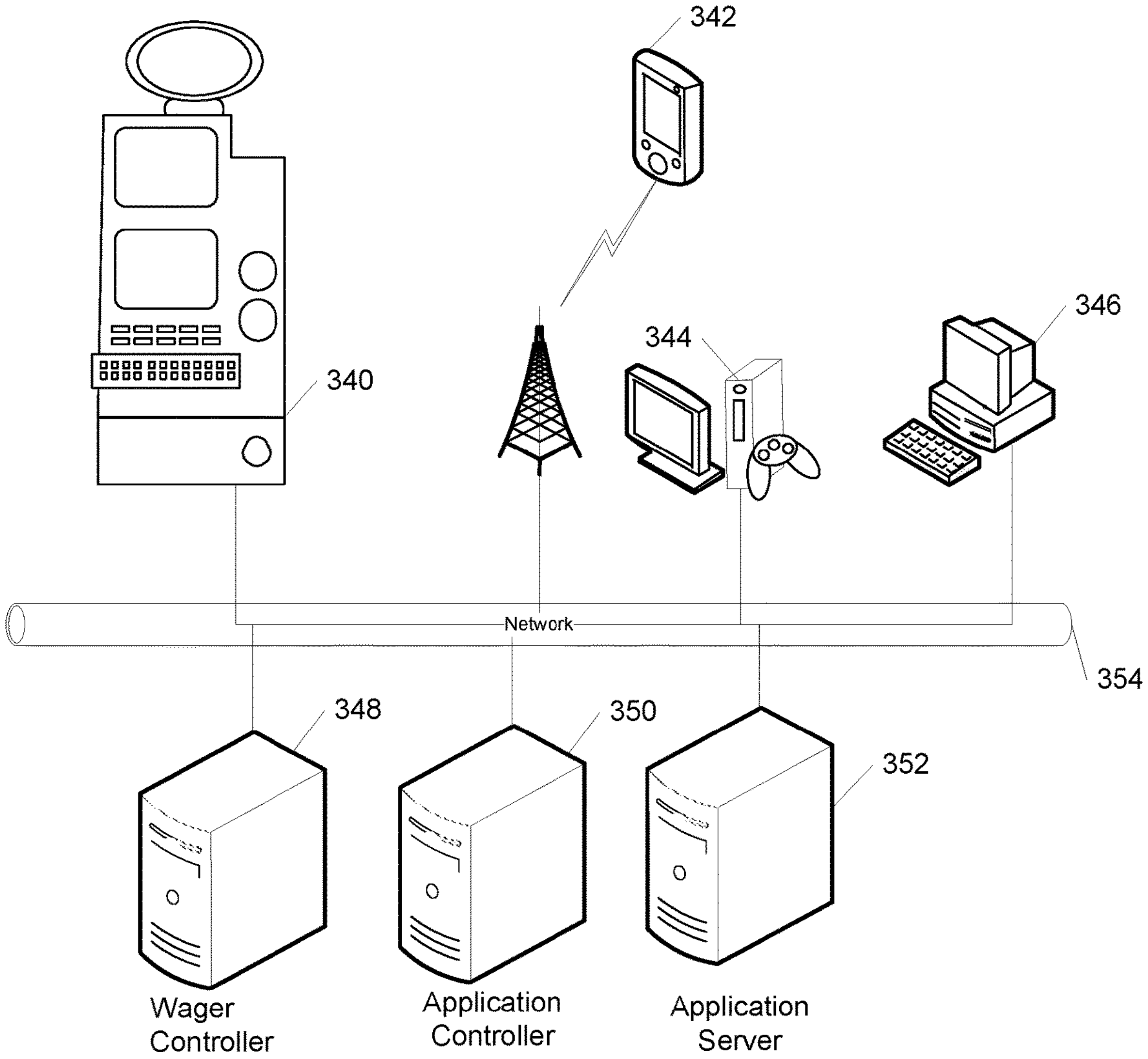

Some fungible object award interleaved wagering systems in accordance with many embodiments of the invention can be distributed across a plurality of devices in various configurations. FIGS. 3A, 3B and 3C are diagrams of distributed fungible object award interleaved wagering systems in accordance with various embodiments of the invention. Turning now to FIG. 3A, one or more interactive controllers of a distributed fungible object award interleaved wagering system, such as but not limited to, a mobile or wireless device 300, a gaming console 302, a personal computer 304, and an electronic gaming machine 305, are operatively connected with a wager controller 306 of a distributed fungible object award interleaved wagering system using a communication link 308. Communication link 308 is a communications link that allows processing systems to communicate with each other and to share data. Examples of the communication link 308 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of an interactive controller and an application controller as described herein are executed on the individual interactive controllers 300, 302, 304 and 305 while one or more processes of a wager controller as described herein can be executed by the wager controller 306.

In many embodiments, a distributed fungible object award interleaved wagering system and may be operatively connected using a communication link to a session and/or user management controller 307, that performs the processes of a session and/or user management controller as described herein.

A distributed fungible object award interleaved wagering system in accordance with another embodiment of the invention is illustrated in FIG. 3B. As illustrated, one or more interactive controllers of a distributed fungible object award interleaved wagering system, such as but not limited to, a mobile or wireless device 310, a gaming console 312, a personal computer 314, and an electronic gaming machine 315, are operatively connected with a wager controller server 316 and an application controller 318 over a communication link 320. Communication link 320 is a communication link that allows processing systems to communicate and share data. Examples of the communication link 320 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, the processes of an interactive controller as described herein are executed on the individual interactive controllers 310, 312, 314 and 315. One or more processes of a wager controller as described herein are executed by the wager controller 316, and one or more processes of an application controller as described herein are executed by the application controller 318.

In many embodiments, a distributed fungible object award interleaved wagering system and may be operatively connected using a communication link to a session and/or user management controller 319, that performs the processes of a session and/or user management controller as described herein.

A distributed fungible object award interleaved wagering systems in accordance with still another embodiment of the invention is illustrated in FIG. 3C. As illustrated, one or more interactive controllers of a distributed fungible object award interleaved wagering system, such as but not limited to, a mobile device 342, a gaming console 344, a personal computer 346, and an electronic gaming machine 340 are operatively connected with a wager controller 348 and an application controller 350, and an interactive application server 352 using a communication link 354. Communication link 354 is a communications link that allows processing systems to communicate and to share data. Examples of the communication link 354 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of a display and user interface of an interactive controller as described herein are executed on the individual interactive controllers 340, 342, 344 and 346. One or more processes of a wager controller as described herein can be executed by the wager controller server 348. One or more processes of an application controller as described herein can be executed by the application controller server 350 and one or more processes of an interactive controller excluding the display and user interfaces can be executed by the interactive application server 352.

In many embodiments, a distributed fungible object award interleaved wagering system and may be operatively connected using a communication link to a session and/or user management controller 353, that performs the processes of a session and/or user management controller as described herein.

In various embodiments, a user management and session controller may be operatively connected to components of a fungible object award interleaved wagering system using a communication link. In other embodiments, a number of other peripheral systems, such as a user management system, a gaming establishment management system, a regulatory system, and/or hosting servers are also operatively connected with the fungible object award interleaved wagering systems using a communication link. Also, other servers can reside outside the bounds of a network within a firewall of the operator to provide additional services for network connected fungible object award interleaved wagering systems.

Although various distributed fungible object award interleaved wagering systems are described herein, fungible object award interleaved wagering systems can be distributed in any configuration as appropriate to the specification of a specific application in accordance with embodiments of the invention. In some embodiments, components of a distributed fungible object award interleaved wagering system, such as an application controller, wager controller, interactive controller, or other servers that perform services for an application controller, wager controller and/or interactive controller, can be distributed in different configurations for a specific distributed fungible object award interleaved wagering system application.

Figure 4A:
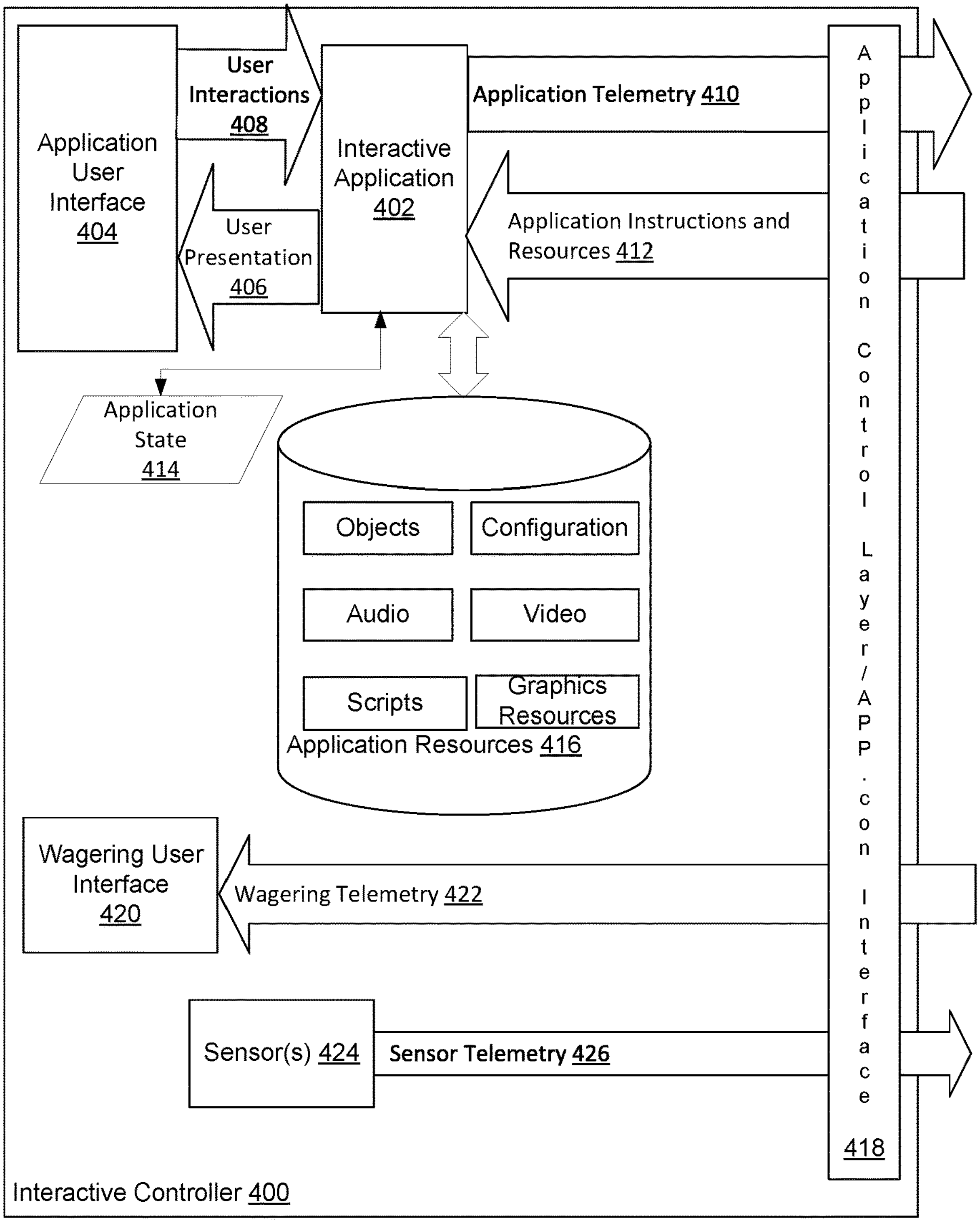
FIGS. 4A and 4B are diagrams of a structure of an interactive controller of a fungible object award interleaved wagering system in accordance with various embodiments of the invention.
Figure 4B:
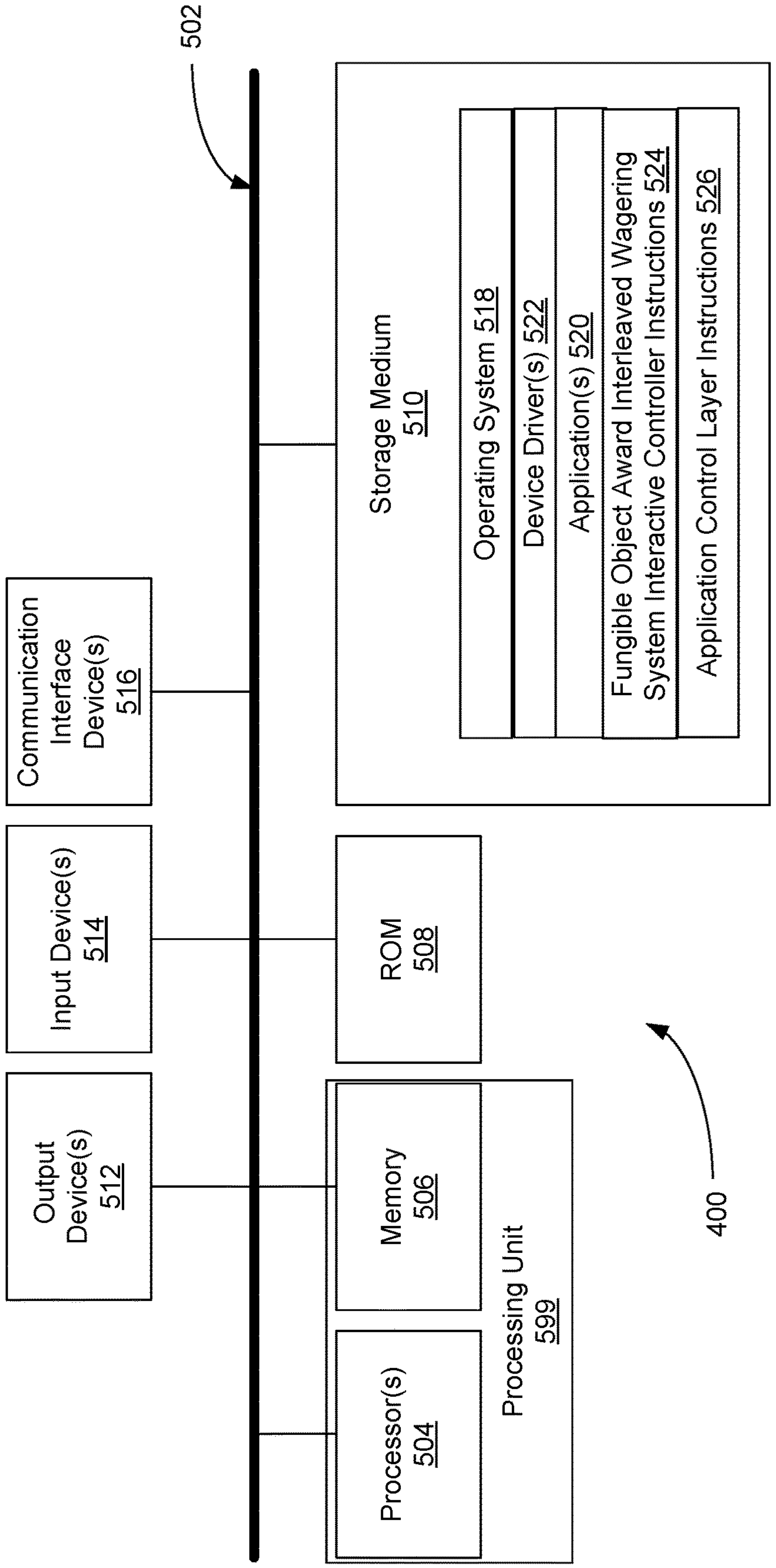

FIGS. 4A and 4B are diagrams of a structure of an interactive controller of a fungible object award interleaved wagering system in accordance with various embodiments of the invention. An interactive controller may be constructed from or configured using one or more processing devices configured to perform the operations of the interactive controller. In many embodiments, an interactive controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 4A, an interactive controller 400, suitable for use as interactive controller 120 of FIG. 1A, provides an execution environment for an interactive application 402 of a fungible object award interleaved wagering system. In several embodiments, an interactive controller 400 of a fungible object award interleaved wagering system provides an interactive application 402 that generates an application user interface 404 for interaction with by a user. The interactive application 402 generates a user presentation 406 that is presented to the user through the application user interface 404. The user presentation 406 may include audio features, visual features or tactile features, or any combination of these features. The application user interface 404 further includes one or more human input devices (HIDs) interfaces that communicate with one or more HIDs (e.g., the input devices 514 of FIG. 4*b*) that the user can use to interact with the fungible object award interleaved wagering system. The user's interactions 408 are included by the interactive application 402 in application telemetry data 410 that is communicated by interactive controller 400 to various other components of a fungible object award interleaved wagering system as described herein. The interactive application 402 receives application instructions and resources 412 communicated from various other components of a fungible object award interleaved wagering system as described herein.

In some embodiments, various components of the interactive application 402 can read data from an application state 414 in order to provide one or more features of the interactive application. In various embodiments, components of the interactive application 402 can include, but are not limited to, a physics engine, a rules engine, and/or a graphics engine. The physics engine is used to simulate physical interactions between virtual objects in the interactive application 402. The rules engine implements the rules of the interactive application and a P/RNG that may be used for influencing or determining certain variables and/or outcomes to provide a randomizing influence on the operations of the interactive application. The graphics engine is used to generate a visual representation of the interactive application state to the user. Furthermore, the components may also include an audio engine to generate audio outputs for the user interface.

During operation, the interactive application reads and writes application resources 416 stored on a data store of the interactive controller host. The application resources 416 may include objects having graphics and/or control logic used to provide application environment objects of the interactive application. In various embodiments, the resources may also include, but are not limited to, video files that are used to generate a portion of the user presentation 406; audio files used to generate music, sound effects, etc. within the interactive application; configuration files used to configure the features of the interactive application; scripts or other types of control code used to provide various features of the interactive application; and graphics resources such as textures, objects, etc. that are used by a graphics engine to render objects displayed in an interactive application.

In operation, components of the interactive application 402 read portions of the application state 414 and generate the user presentation 406 for the user that is presented to the user using the user interface 404. The user perceives the user presentation and provides user interactions 408 using the HIDs. The corresponding user interactions are received as user actions or inputs by various components of the interactive application 402. The interactive application 402 translates the user actions into interactions with the virtual objects of the application environment stored in the application state 414. Components of the interactive application use the user interactions with the virtual objects of the interactive application and the interactive application state 414 to update the application state 414 and update the user presentation 406 presented to the user. The process loops continuously while the user interacts with the interactive application of the fungible object award interleaved wagering system.

The interactive controller 400 provides one or more interfaces 418 between the interactive controller 400 and other components of a fungible object award interleaved wagering system, such as, but not limited to, an application controller. The interactive controller 400 and the other fungible object award interleaved wagering system components communicate with each other using the interfaces. The interface may be used to pass various types of data, and to communicate and receive messages, status data, commands and the like. In certain embodiments, the interactive controller 400 and an application controller communicate application instructions and environment resources 412 and application telemetry data 410. In some embodiments, the communications include requests by the application controller that the interactive controller 400 update the application state 414 using data provided by the application controller.

In many embodiments, a communication by an application controller includes a request that the interactive controller 400 update one or more resources 416 using data provided by the application controller. In a number of embodiments, the interactive controller 400 provides all or a portion of the application state to the application controller. In some embodiments, the interactive controller 400 may also provide data about one or more of the application resources 416 to the application controller. In some embodiments, the communication includes user interactions that the interactive controller 400 communicates to the application controller. The user interactions may be low level user interactions with the user interface 404, such as manipulation of a HID, or may be high level interactions with game objects as determined by the interactive application. The user interactions may also include resultant actions such as modifications to the application state 414 or game resources 416 resulting from the user's interactions taken in the fungible object award interleaved wagering system interactive application. In some embodiments, user interactions include, but are not limited to, actions taken by entities such as non-player characters (NPC) of the interactive application that act on behalf of or under the control of the user.

In some embodiments, the interactive controller 400 includes a wagering user interface 420 used to communicate fungible object award interleaved wagering system telemetry data 422 to and from the user. The fungible object award interleaved wagering system telemetry data 422 from the fungible object award interleaved wagering system include, but are not limited to, data used by the user to configure Cr, AC and element wagers, and data about the wagering game Cr, AC and element wagers such as, but not limited to, Cr, AC and element balances and Cr, AC and element amounts wagered.

In some embodiments, the interactive controller includes one or more sensors 424. Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors (GPSs). The interactive controller 400 communicates sensor telemetry data 426 to one or more components of the fungible object award interleaved wagering system.

Referring now to FIG. 4B, interactive controller 400 includes a bus 502 that provides an interface for one or more processors 504, random access memory (RAM) 506, read only memory (ROM) 508, machine-readable storage medium 510, one or more user output devices 512, one or more user input devices 514, and one or more communication interface devices 516.

The one or more processors 504 may take many forms, such as, but not limited to: a central processing unit (CPU); a multi-processor unit (MPU); an ARM processor; a controller; a programmable logic device; or the like.

In the example embodiment, the one or more processors 504 and the random access memory (RAM) 506 form an interactive controller processing unit 599. In some embodiments, the interactive controller processing unit includes one or more processors operatively connected to one or more of a RAM, ROM, and machine-readable storage medium; the one or more processors of the interactive controller processing unit receive instructions stored by the one or more of a RAM, ROM, and machine-readable storage medium via a bus; and the one or more processors execute the received instructions. In some embodiments, the interactive controller processing unit is an ASIC (Application-Specific Integrated Circuit). In some embodiments, the interactive controller processing unit is a SoC (System-on-Chip).

Examples of output devices 512 include, but are not limited to, display screens; light panels; and/or lighted displays. In accordance with particular embodiments, the one or more processors 504 are operatively connected to audio output devices such as, but not limited to: speakers; and/or sound amplifiers. In accordance with many of these embodiments, the one or more processors 504 are operatively connected to tactile output devices like vibrators, and/or manipulators.

Examples of user input devices 514 include, but are not limited to: tactile devices including but not limited to, keyboards, keypads, foot pads, touch screens, and/or trackballs; non-contact devices such as audio input devices; motion sensors and motion capture devices that the interactive controller can use to receive inputs from a user when the user interacts with the interactive controller; physiological sensors that monitor the physiology of the user; environmental sensors that monitor the physical environment of the interactive controller; accelerometers that monitor changes in motion of the interactive controller; and location sensors that monitor the location of the interactive controller such as global positioning sensors.

The one or more communication interface devices 516 provide one or more wired or wireless interfaces for communicating data and commands between the interactive controller 400 and other devices that may be included in a fungible object award interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 510 stores machine-executable instructions for various components of the interactive controller, such as but not limited to: an operating system 518; one or more device drivers 522; one or more application programs 520 including but not limited to an interactive application; and fungible object award interleaved wagering system interactive controller instructions 524 for use by the one or more processors 504 to provide the features of an interactive controller as described herein. In some embodiments, the machine-executable instructions further include application control layer/application control interface instructions 526 for use by the one or more processors 504 to provide the features of an application control layer/application control interface as described herein.

In various embodiments, the machine-readable storage medium 510 is one of a (or a combination of two or more of) a hard drive, a flash drive, a DVD, a CD, a flash storage, a solid state drive, a ROM, an EEPROM, and the like.

In operation, the machine-executable instructions are loaded into memory 506 from the machine-readable storage medium 510, the ROM 508 or any other storage location. The respective machine-executable instructions are accessed by the one or more processors 504 via the bus 502, and then executed by the one or more processors 504. Data used by the one or more processors 504 are also stored in memory 506, and the one or more processors 504 access such data during execution of the machine-executable instructions. Execution of the machine-executable instructions causes the one or more processors 504 to control the interactive controller 400 to provide the features of a fungible object award interleaved wagering system interactive controller as described herein Although the interactive controller is described herein as being constructed from or configured using one or more processors and instructions stored and executed by hardware components, the interactive controller can be constructed from or configured using only hardware components in accordance with other embodiments. In addition, although the storage medium 510 is described as being operatively connected to the one or more processors through a bus, those skilled in the art of interactive controllers will understand that the storage medium can include removable media such as, but not limited to, a USB memory device, an optical CD ROM, magnetic media such as tape and disks. In some embodiments, the storage medium 510 can be accessed by the one or more processors 504 through one of the communication interface devices 516 or using a communication link. Furthermore, any of the user input devices or user output devices can be operatively connected to the one or more processors 504 via one of the communication interface devices 516 or using a communication link.

In some embodiments, the interactive controller 400 can be distributed across a plurality of different devices. In many such embodiments, an interactive controller of a fungible object award interleaved wagering system includes an interactive application server operatively connected to an interactive client using a communication link. The interactive application server and interactive application client cooperate to provide the features of an interactive controller as described herein.

In various embodiments, the interactive controller 400 may be used to construct other components of a fungible object award interleaved wagering system as described herein.

In some embodiments, components of an interactive controller and an application controller of a fungible object award wagering interleaved system may be constructed from or configured using a single device using processes that communicate using an interprocess communication protocol. In other such embodiments, the components of an interactive controller and an application controller of a fungible object award wagering interleaved system may communicate by passing messages, parameters or the like.

Figure 5A:
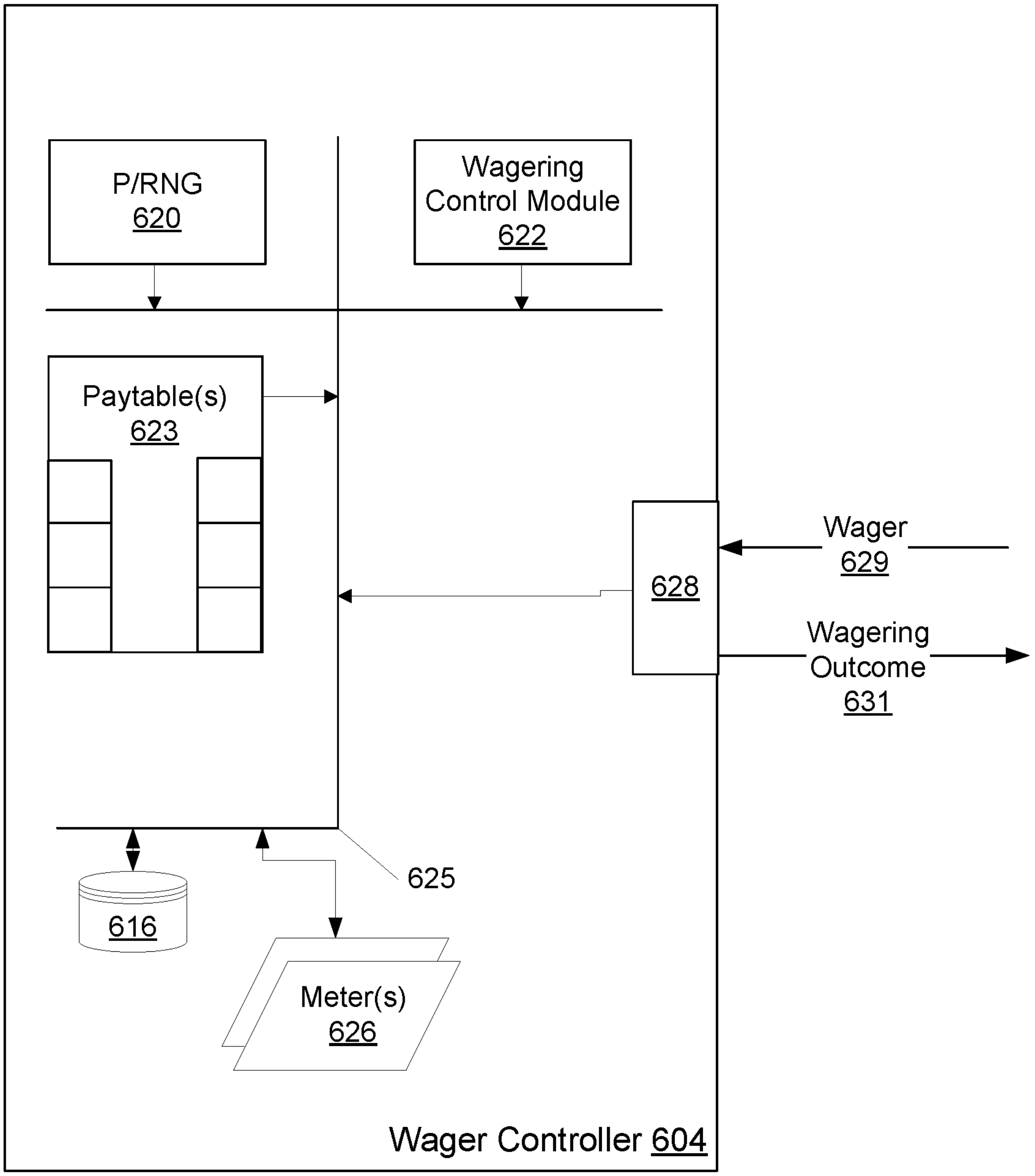
FIGS. 5A and 5B are diagrams of a structure of a wager controller of a fungible object award interleaved wagering system in accordance with various embodiments of the invention.
Figure 5B:
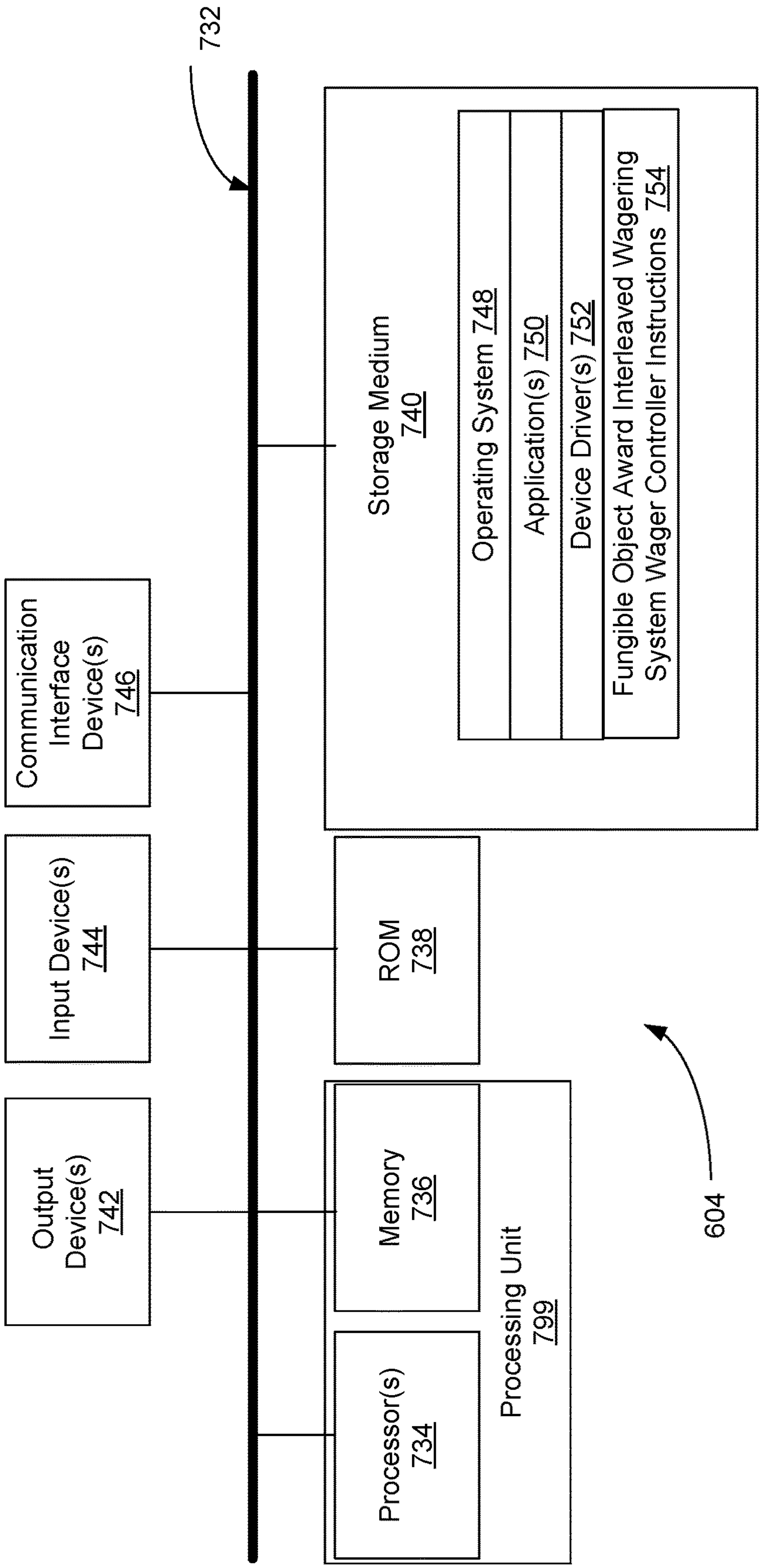

FIGS. 5A and 5B are diagrams of a structure of a wager controller of a fungible object award interleaved wagering system in accordance with various embodiments of the invention. A wager controller may be constructed from or configured using one or more processing devices configured to perform the operations of the wager controller. In many embodiments, a wager controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 5A, in various embodiments, a wager controller 604, suitable for use as wager controller 102 of FIG. 1A, includes a pseudorandom or random number generator (P/RNG) 620 to produce random results or pseudo random results; one or more paytables 623 which includes a plurality of factors indexed by the random result to be multiplied with an amount of Cr, AC, elements, or objects committed in a wager; and a wagering control module 622 whose processes may include, but are not limited to, generating random results, looking up factors in the paytables, multiplying the factors by an amount of Cr, AC, elements, or objects wagered, and administering one or more Cr, AC, element, or object meters 626. The various wager controller components can interface with each other via an internal bus 625 and/or other appropriate communication mechanism.

An interface 628 allows the wager controller 604 to operatively connect to an external device, such as one or more application controllers as described herein. The interface 628 provides for receiving of wager data 629 from the external device that is used to specify wager parameters and/or trigger execution of a wager by the wager controller 604. The interface 628 may also provide for communicating wager outcome data 631 to an external device. In numerous embodiments, the interface between the wager controller 604 and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

In various embodiments, a wager controller 604 may use a P/RNG provided by an external system. The external system may be connected to the wager controller 604 by a suitable communication network such as a local area network (LAN) or a wide area network (WAN). In some embodiments, the external P/RNG is a central deterministic system that provides random or pseudo random results to one or more connected wager controllers.

During operation of the wager controller, the external system communicates wager data 629 to the wager controller 604. The wager controller 604 receives the wager data and uses the wager data to trigger execution of a wager in accordance with a wagering proposition. The wager controller 604 executes the wager and determines a wager outcome for the wager. The wager controller communicates wager outcome data 631 of the wager outcome to the external system.

In some embodiments, the wager controller uses the wager data to select a paytable 628 to use and/or an amount of Cr, AC, elements, or objects to wager.

In some embodiments, the wager outcome data may include, but is not limited to, an amount of Cr, AC, elements, or objects won in the wager.

In various embodiments, the wager outcome data may include, but is not limited to, an amount of Cr, AC, elements, or objects in the one or more meters 626.

In some embodiments, the wager outcome data includes state data for the wagering proposition of the executed wager. The state data may correspond to one or more game states of a gambling game that is associated with the wagering proposition. Examples of state data include, but are not limited to, reel strips in an operation state or a final state for a reel-based gambling game, one or more dice positions for a dice-based gambling game, positions of a roulette wheel and roulette ball, position of a wheel of fortune, or the like.

In various embodiments, the wagering control module 622 determines an amount of a wager and a paytable to use from the one or more paytables 623. In such embodiments, in response to the wager data triggering execution of the wager, the wager control module 622 executes the wager by requesting a P/RNG result from the P/RNG 620; retrieving a paytable from the one or more paytables 623; adjusting the one or more credit meters 626 for an amount of the wager; applying the P/RNG result to the retrieved paytable; multiplying the resultant factor from the paytable by an amount wagered to determine a wager outcome; updating the one or more meters 626 based on the wager outcome; and communicating the wager outcome to the external device.

In various embodiments, an external system communicates a request for a P/RNG result from the wager controller 604. In response, the wager controller 604 returns a P/RNG result as a function of an internal P/RNG or a P/RNG external to the external system to which the wager controller 604 is operatively connected.

In some embodiments, a communication exchange between the wager controller 604 and an external system relate to the external system support for coupling a P/RNG result to a particular paytable contained in the wager controller 604. In such an exchange, the external system communicates to the wager controller 604 as to which of the one or more paytables 623 to use, and requests a result whereby the P/RNG result would be associated with the requested paytable 623. The result of the coupling is returned to the external system. In such an exchange, no actual Cr, AC, element, or object wager is conducted, but might be useful in coupling certain non-value wagering interactive application behaviors and propositions to the same final resultant wagering return which is understood for the fungible object award interleaved wagering system to conduct wagering.

In some embodiments, the wager controller 604 may also include storage for statuses, wagers, wager outcomes, meters and other historical events in a storage device 616.

In some embodiments, an authorization access module provides a process to permit access and command exchange with the wager controller 604 and access to the one or more credit meters 626 for the amount of Cr, AC, elements, or objects being wagered by the user in the fungible object award interleaved wagering system.

In numerous embodiments, communication occurs between various types of a wager controller and an external system 630, such as application controller. In some of these embodiments, the purpose of the wager controller is to allocate wagers to pools, detect occurrences of one or more events upon which the wagers were made, and determine the wager outcomes for each individual wager based on the number of winning wagers and the amount paid into the pool.

In some embodiments, the wager controller manages accounts for individual users wherein the users make deposits into the accounts, amounts are deducted from the accounts, and amounts are credited to the users' accounts based on the wager outcomes.

In some embodiments a wager controller is a pari-mutuel wagering system such as used for wagering on an events such as horse races, greyhound races, sporting events and the like. In a pari-mutuel wagering system, user's wagers on the outcome of an event are allocated to a pool. When the event occurs, wager outcomes are calculated by sharing the pool among all winning wagers.

In various embodiments, a wager controller is a central determination system, such as but not limited to a central determination system for a Class II wagering system or a wagering system in support of a "scratch off" style lottery. In such a wagering system, a player plays against other players and competes for a common prize. In a given set of wager outcomes, there are a certain number of wins and losses. Once a certain wager outcome has been determined, the same wager outcome cannot occur again until a new set of wager outcomes is generated.

In numerous embodiments, communication occurs between various components of a wager controller 604 and an external system, such as an application controller. In some of these embodiments, the purpose of the wager controller 604 is to manage wagering on wagering events and to provide random (or pseudo random) results from a P/RNG.

Referring now to FIG. 5B, wager controller 604 includes a bus 732 that provides an interface for one or more processors 734, random access memory (RAM) 736, read only memory (ROM) 738, machine-readable storage medium 740, one or more user output devices 742, one or more user input devices 744, and one or more communication interface and/or network interface devices 746.

The one or more processors 734 may take many forms, such as, but not limited to, a central processing unit (CPU), a multi-processor unit (MPU), an ARM processor, a controller, a programmable logic device, or the like.

In the example embodiment, the one or more processors 734 and the random access memory (RAM) 736 form a wager controller processing unit 799. In some embodiments, the wager controller processing unit includes one or more processors operatively connected to one or more of a RAM, ROM, and machine-readable storage medium; the one or more processors of the wager controller processing unit receive instructions stored by the one or more of a RAM, ROM, and machine-readable storage medium via a bus; and the one or more processors execute the received instructions. In some embodiments, the wager controller processing unit is an ASIC (Application-Specific Integrated Circuit). In some embodiments, the wager controller processing unit is a SoC (System-on-Chip).

Examples of output devices 742 include, but are not limited to, display screens, light panels, and/or lighted displays. In accordance with particular embodiments, the one or more processors 734 are operatively connected to audio output devices such as, but not limited to speakers, and/or sound amplifiers. In accordance with many of these embodiments, the one or more processors 734 are operatively connected to tactile output devices like vibrators, and/or manipulators.

Examples of user input devices 734 include, but are not limited to, tactile devices including but not limited to, keyboards, keypads, touch screens, and/or trackballs; non-contact devices such as audio input devices; motion sensors and motion capture devices that the wager controller can use to receive inputs from a user when the user interacts with the wager controller 604.

The one or more communication interface and/or network interface devices 746 provide one or more wired or wireless interfaces for exchanging data and commands between the wager controller 604 and other devices that may be included in a fungible object award interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 740 stores machine-executable instructions for various components of a wager controller, such as but not limited to: an operating system 748; one or more application programs 750; one or more device drivers 752; and fungible object award interleaved wagering system wager controller instructions 754 for use by the one or more processors 734 to provide the features of a fungible object award interleaved wagering system wager controller as described herein.

In various embodiments, the machine-readable storage medium 740 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 740, the ROM 738 or any other storage location. The respective machine-executable instructions are accessed by the one or more processors 734 via the bus 732, and then executed by the one or more processors 734. Data used by the one or more processors 734 are also stored in memory 736, and the one or more processors 734 access such data during execution of the machine-executable instructions. Execution of the machine-executable instructions causes the one or more processors 734 to control the wager controller 604 to provide the features of a fungible object award interleaved wagering system wager controller as described herein Although the wager controller 604 is described herein as being constructed from or configured using one or more processors and machine-executable instructions stored and executed by hardware components, the wager controller can be composed of only hardware components in accordance with other embodiments. In addition, although the storage medium 740 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 740 can be accessed by the one or more processors 734 through one of the interfaces or using a communication link. Furthermore, any of the user input devices or user output devices can be operatively connected to the one or more processors 734 via one of the interfaces or using a communication link.

In various embodiments, the wager controller 604 may be used to construct other components of a fungible object award interleaved wagering system as described herein.

In some embodiments, components of a wager controller and an application controller of a fungible object award wagering interleaved system may be constructed from or configured using a single device using processes that communicate using an interprocess communication protocol. In other such embodiments, the components of a wager controller and an application controller of a fungible object award wagering interleaved system may communicate by passing messages, parameters or the like.

It should be understood that there may be many embodiments of a wager controller 604 which could be possible, including forms where many modules and components of the wager controller are located in various servers and locations, so the foregoing is not meant to be exhaustive or all inclusive, but rather provide data on various embodiments of a wager controller 604.

Figure 6A:
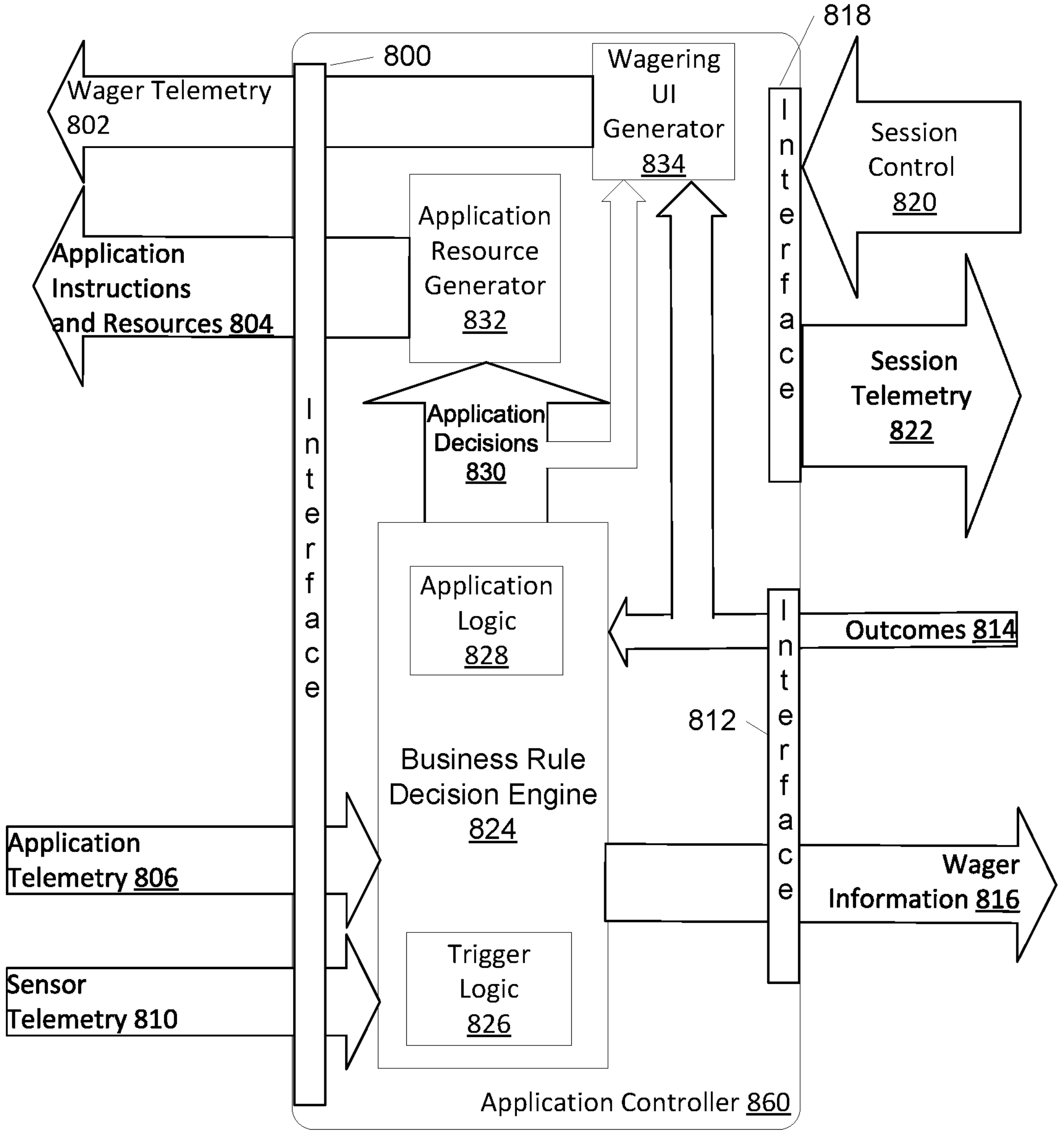
FIGS. 6A and 6B are diagrams of a structure of an application controller of a fungible object award interleaved wagering system in accordance with various embodiments of the invention.
Figure 6B:
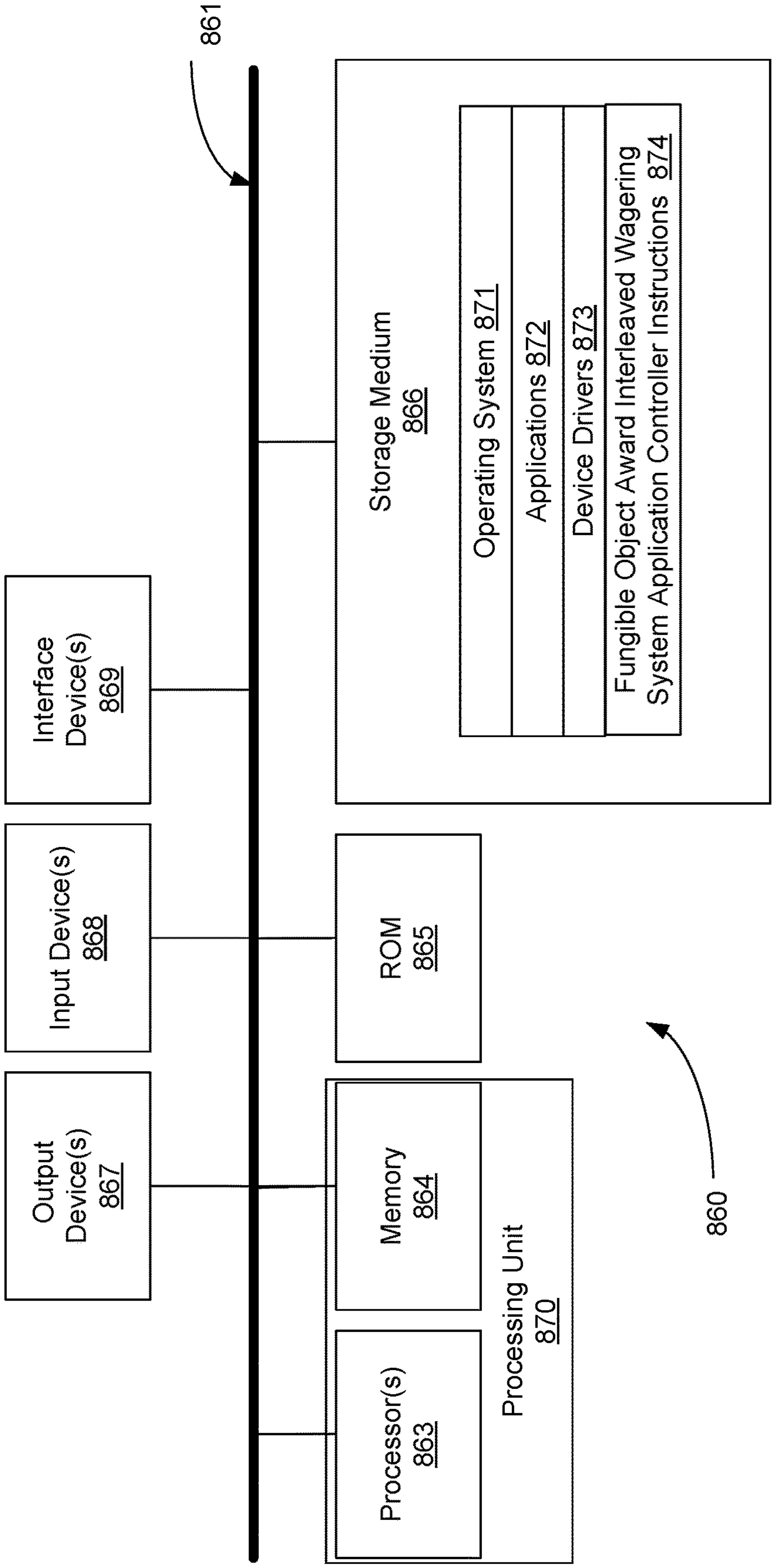

FIGS. 6A and 6B are diagrams of a structure of an application controller of a fungible object award interleaved wagering system in accordance with various embodiments of the invention. An application controller may be constructed from or configured using one or more processing devices configured to perform the operations of the application controller. In many embodiments, an application controller can be constructed from or configured using various types of processing devices including, but not limited to, a mobile device such as a smartphone, a personal digital assistant, a wireless device such as a tablet computer or the like, an electronic gaming machine, a personal computer, a gaming console, a set-top box, a computing device, a controller, or the like.

Referring now to FIG. 6A, in many embodiments, an application controller 860, suitable for use as application controller 112 of FIG. 1A, manages operation of a fungible object award interleaved wagering system, with a wager controller and an interactive controller being support units to the application controller 860. The application controller 860 provides an interface between the interactive application, provided by an interactive controller, and a wagering proposition, provided by a wager controller.

In some embodiments, the application controller 860 includes an interactive controller interface 800 to an interactive controller. The interactive controller interface 800 provides for communication of data between an interactive controller and the application controller 860, including but not limited to wager telemetry data 802, application instructions and resources 804, application telemetry data 806, and sensor telemetry data 810.

In various embodiments, the application controller 860 includes a wager controller interface 812 to a wager controller. The wager controller interface 812 provides for communication of data between the application controller 860 and a wager controller, including but not limited to wager outcomes 814 and wager data 816.

In some embodiments, the application controller 860 includes a user management and session controller interface 818 to a user management and session controller. The user management and session controller interface 818 provides for communication of data between the application controller 860 and a user management and session controller, including but not limited to user session control data 820 and user session telemetry data 822.

The application controller 860 includes a business rule decision engine 824 that receives telemetry data, such as application telemetry data and sensor telemetry data, from an interactive controller. The business rule decision engine 824 uses the telemetry data, along with trigger logic 826 to generate wager data used to trigger a wager in a wager controller.

In some embodiments, the application telemetry data includes, but is not limited to, application environment variables that indicate the state of an interactive application being used by a user, interactive controller data indicating a state of an interactive controller, and user actions and interactions between a user and an interactive application provided by an interactive controller. The wagering and/or wager data may include, but is not limited to, an amount and type of the wager, a trigger of the wager, and a selection of a paytable to be used when executing the wager.

In some embodiments, the business rule decision engine 824 also receives wager outcome data from a wager controller. The decision engine 824 uses the wager outcome data, in conjunction with telemetry data and application logic 828 to generate application decisions 830 communicated to an application resource generator 832. The application resource generator 832 receives the application decisions and uses the application decisions to generate application instructions and application resources to be communicated to an interactive application.

In many embodiments, the application controller 860 includes a pseudo random or random result generator used to generate random results that are communicated to the application resource generator 832. The application resource generator uses the random results to generate application instructions and application resources to be communicated to an interactive controller for use by an interactive application.

In various embodiments, the business rule decision engine 824 also determines an amount of AC to award to a user based at least in part on the user's use of an interactive application of the fungible object award interleaved wagering system as determined from application telemetry data. In some embodiments, wager outcome data may also be used to determine the amount of AC that should be awarded to the user.

In numerous embodiments, an interactive application is a skill-based interactive game and the AC is awarded to the user for the user's skillful play of the skill-based interactive game.

In some embodiments, the application decisions and wager outcome data are communicated to a wagering user interface generator 834. The wagering user interface generator 834 receives the application decisions and wager outcome data and generates wager telemetry data describing the state of wagering and credit accumulation and loss for the fungible object award interleaved wagering system. In some embodiments, the wager telemetry data 146 may include, but is not limited to, amounts of AC and elements earned, lost or accumulated by the user through use of the interactive application as determined from the application decisions, and Cr amounts won, lost or accumulated as determined from the wager outcome data and the one or more credit meters.

In some embodiments, the wager outcome data 814 also includes data about one or more game states of a gambling game executed in accordance with a wagering proposition by a wager controller. In various such embodiments, the wagering user interface generator 834 generates a gambling game process display and/or gambling game state display using the one or more game states of the gambling game. The gambling game process display and/or gambling game state display is included in wager telemetry data that is communicated to an interactive controller. The gambling game process display and/or a gambling game state display is displayed by a wagering user interface of the interactive controller to a user. In other such embodiments, the one or more game states of the gambling game are communicated to an interactive controller and a wagering user interface of the interactive controller generates a gambling game process display and/or gambling game state display using the one or more game states of the gambling game for display to a user.

The application controller 860 can further operatively connect to a wager controller to determine an amount of credit or elements available and other wagering metrics of a wagering proposition. Thus, the application controller 860 may potentially affect an amount of Cr in play for participation in the wagering events of a wagering game provided by the wager controller. The application controller 860 may additionally include various audit logs and activity meters. In some embodiments, the application controller 860 can also couple to a centralized server for exchanging various data related to the user and the activities of the user during game play of a fungible object award interleaved wagering system.

In some embodiments, the operation of the application controller 860 does not affect the provision of a wagering proposition by a wager controller except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In a number of embodiments, communication of wager data between a wager controller and the application controller 860 can further be used to communicate various wagering control factors that the wager controller uses as input. Examples of wagering control factors include, but are not limited to, an amount of Cr, AC, elements, or objects consumed per wagering event, and/or the user's election to enter a jackpot round.

In some embodiments, the application controller 860 utilizes a wagering user interface to communicate certain interactive application data to the user, including but not limited to, club points, user status, control of the selection of user choices, and messages which a user can find useful in order to adjust the interactive application experience or understand the wagering status of the user in accordance with the wagering proposition in the wager controller.

In some embodiments, the application controller 860 utilizes a wagering user interface to communicate aspects of a wagering proposition to the user including, but not limited to, odds of certain wager outcomes, amount of Cr, AC, elements, or objects in play, and amounts of Cr, AC, elements, or objects available.

In a number of embodiments, a wager controller can accept wager proposition factors including, but not limited to, modifications in the amount of Cr, AC, elements, or objects wagered on each individual wagering event, a number of wagering events per minute the wager controller can resolve, entrance into a bonus round, and other factors. In several embodiments, the application controller 860 can communicate a number of factors back and forth to the wager controller, such that an increase/decrease in a wagered amount can be related to the change in user profile of the user in the interactive application. In this manner, a user can control a wager amount per wagering event in accordance with the wagering proposition with the change mapping to a parameter or component that is applicable to the interactive application experience.

Referring now to FIG. 6B, application controller 860 includes a bus 861 providing an interface for one or more processors 863, random access memory (RAM) 864, read only memory (ROM) 865, machine-readable storage medium 866, one or more user output devices 867, one or more user input devices 868, and one or more communication interface and/or network interface devices 869.

The one or more processors 863 may take many forms, such as, but not limited to: a central processing unit (CPU); a multi-processor unit (MPU); an ARM processor; a programmable logic device; or the like.

Examples of output devices 867 include, include, but are not limited to: display screens; light panels; and/or lighted displays. In accordance with particular embodiments, the one or more processors 863 are operatively connected to audio output devices such as, but not limited to: speakers; and/or sound amplifiers. In accordance with many of these embodiments, the one or more processors 863 are operatively connected to tactile output devices like vibrators, and/or manipulators.

In the example embodiment, the one or more processors 863 and the random access memory (RAM) 864 form an application controller processing unit 870. In some embodiments, the application controller processing unit includes one or more processors operatively connected to one or more of a RAM, ROM, and machine-readable storage medium; the one or more processors of the application controller processing unit receive instructions stored by the one or more of a RAM, ROM, and machine-readable storage medium via a bus; and the one or more processors execute the received instructions. In some embodiments, the application controller processing unit is an ASIC (Application-Specific Integrated Circuit). In some embodiments, the application controller processing unit is a SoC (System-on-Chip).

Examples of user input devices 868 include, but are not limited to: tactile devices including but not limited to, keyboards, keypads, foot pads, touch screens, and/or trackballs; non-contact devices such as audio input devices; motion sensors and motion capture devices that the application controller can use to receive inputs from a user when the user interacts with the application controller 860.

The one or more communication interface and/or network interface devices 869 provide one or more wired or wireless interfaces for exchanging data and commands between the application controller 860 and other devices that may be included in a fungible object award interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 866 stores machine-executable instructions for various components of the application controller 860 such as, but not limited to: an operating system 871; one or more applications 872; one or more device drivers 873; and fungible object award interleaved wagering system application controller instructions 874 for use by the one or more processors 863 to provide the features of an application controller as described herein.

In various embodiments, the machine-readable storage medium 870 is one of a (or a combination of two or more of) a hard drive, a flash drive, a DVD, a CD, a flash storage, a solid state drive, a ROM, an EEPROM, and the like.

In operation, the machine-executable instructions are loaded into memory 864 from the machine-readable storage medium 866, the ROM 865 or any other storage location. The respective machine-executable instructions are accessed by the one or more processors 863 via the bus 861, and then executed by the one or more processors 863. Data used by the one or more processors 863 are also stored in memory 864, and the one or more processors 863 access such data during execution of the machine-executable instructions. Execution of the machine-executable instructions causes the one or more processors 863 to control the application controller 860 to provide the features of a fungible object award interleaved wagering system application controller as described herein.

Although the application controller 860 is described herein as being constructed from or configured using one or more processors and instructions stored and executed by hardware components, the application controller can be composed of only hardware components in accordance with other embodiments. In addition, although the storage medium 866 is described as being operatively connected to the one or more processors through a bus, those skilled in the art of application controllers will understand that the storage medium can include removable media such as, but not limited to, a USB memory device, an optical CD ROM, magnetic media such as tape and disks. Also, in some embodiments, the storage medium 866 may be accessed by processor 863 through one of the interfaces or using a communication link. Furthermore, any of the user input devices or user output devices may be operatively connected to the one or more processors 863 via one of the interfaces or using a communication link.

In various embodiments, the application controller 860 may be used to construct other components of a fungible object award interleaved wagering system as described herein.

In some embodiments, components of an interactive controller and an application controller of a fungible object award wagering interleaved system may be constructed from or configured using a single device using processes that communicate using an interprocess communication protocol. In other such embodiments, the components of an interactive controller and an application controller of a fungible object award wagering interleaved system may communicate by passing messages, parameters or the like.

Figure 7A:
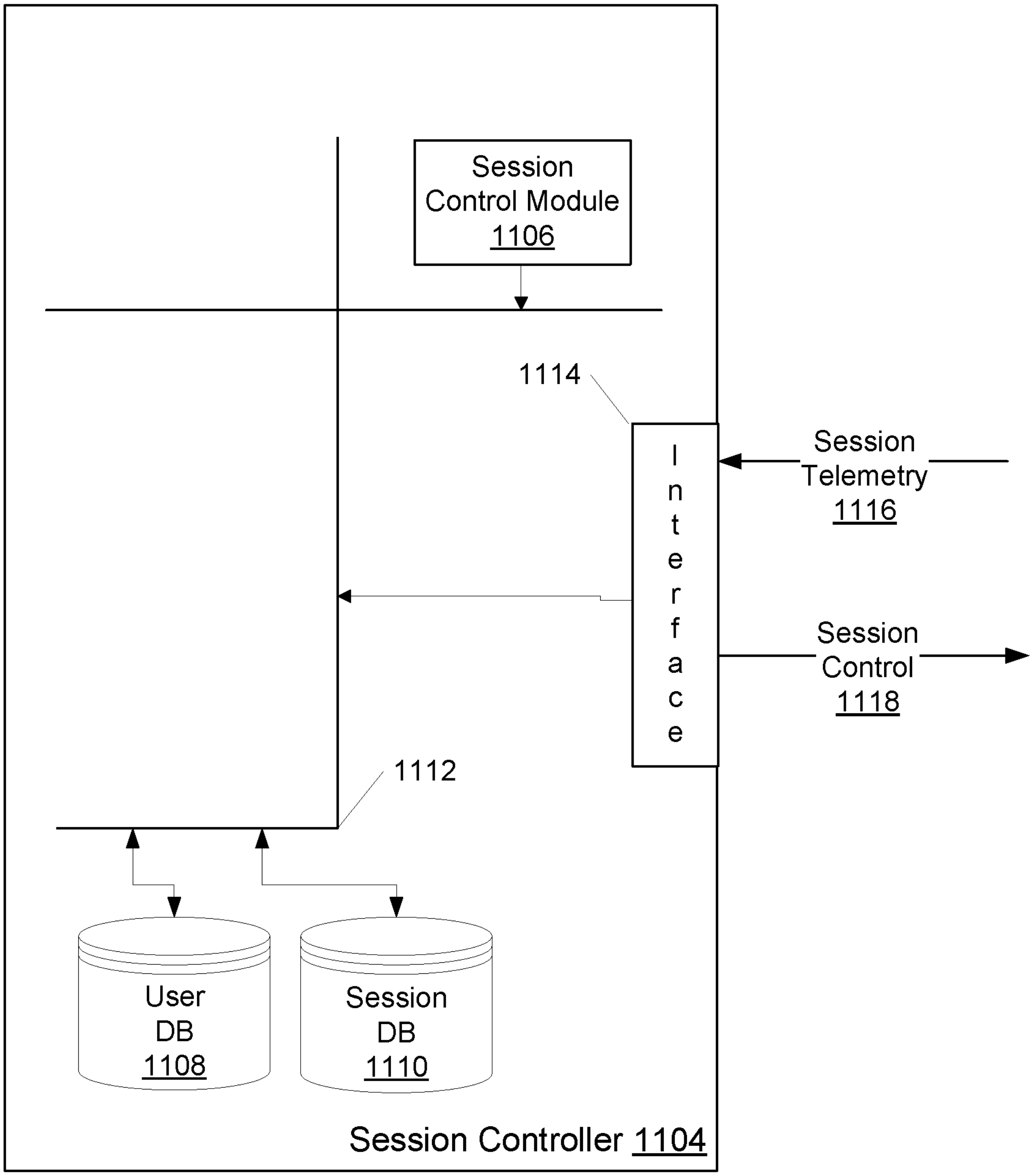
FIGS. 7A and 7B are diagrams of a structure of a user management and session controller of a fungible object award interleaved wagering system in accordance with various embodiments of the invention.
Figure 7B:
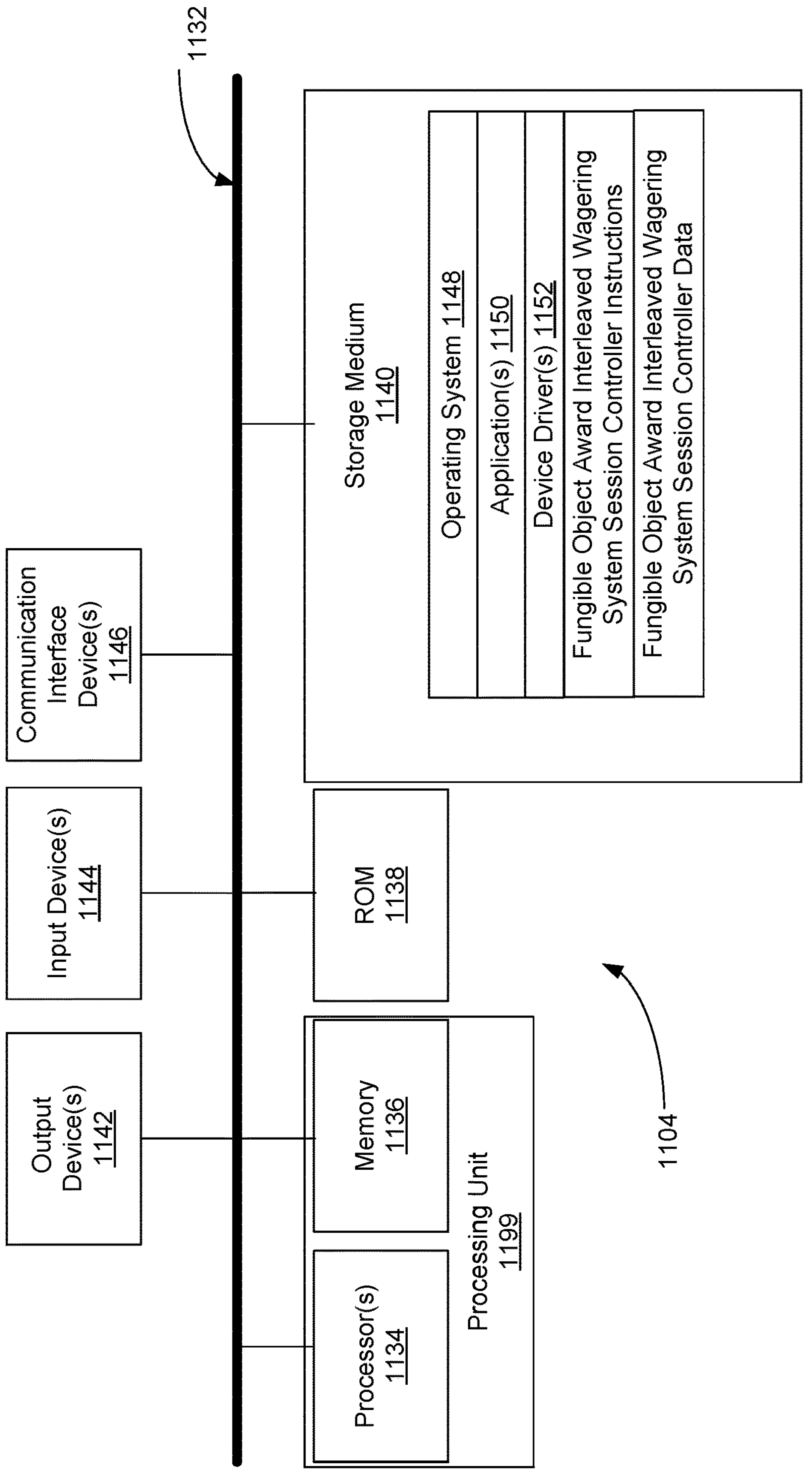

FIGS. 7A and 7B are diagrams of a structure of a user management and session controller of a fungible object award interleaved wagering system in accordance with various embodiments of the invention. A user management and session controller may be constructed from or configured using one or more processing devices configured to perform the operations of the user management and session controller. In many embodiments, a wager user session can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, a server, or the like.

Referring now to FIG. 7A, in various embodiments, a user management and session controller 1104, suitable for use as user management and session controller 150 of FIG. 1A, includes a user management and session control module 1106 whose processes may include, but are not limited to, registering users of a fungible object award wagering interleaved system, validating users of a fungible object award wagering interleaved system using user registration data, managing various types of user sessions for users of the fungible object award wagering interleaved system, and the like.

The user management and session controller 1104 may further include a datastore 1108 storing user data used to manage user registration and validation. The user management and session controller 1104 may further include a datastore 1110 storing user session data used to manage one or more user sessions.

The various user management and session controller components can interface with each other via an internal bus 1112 and/or other appropriate communication mechanism.

An interface 1114 allows the user management and session controller 1104 to operatively connect to one or more external devices, such as one or more application controllers, wager controllers and/or interactive controllers as described herein. The interface provides for receiving session telemetry data 1116 from the one more external devices. The user session telemetry data includes, but is not limited to, amounts of AC earned by one or more users, requests for entering into a fungible object award user session as described herein, and telemetry data regarding the progress of one or more users during a fungible object award user session. The interface 1114 may also provide for communicating secession control data 1118 used to manage a user session.

In numerous embodiments, the interface between the user management and session controller and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

During operation of the user management and session controller, the external system communicates user session telemetry data to the user management and session controller. The user management and session controller receives the user session telemetry data and uses the user session telemetry data to generate user session control data as described herein. The user management and session controller communicates the user session control data to the external system.

Referring now to FIG. 7B, user management and session controller 1104 includes a bus 1132 that provides an interface for one or more processors 1134, random access memory (RAM) 1136, read only memory (ROM) 1138, machine-readable storage medium 1140, one or more user output devices 1142, one or more user input devices 1144, and one or more communication interface and/or network interface devices 1146.

The one or more processors 1134 may take many forms, such as, but not limited to, a central processing unit (CPU), a multi-processor unit (MPU), an ARM processor, a controller, a programmable logic device, or the like.

In the example embodiment, the one or more processors 1134 and the random access memory (RAM) 1136 form a user management and session controller processing unit 1199. In some embodiments, the user management and session controller processing unit includes one or more processors operatively connected to one or more of a RAM, ROM, and machine-readable storage medium; the one or more processors of the user management and session controller processing unit receive instructions stored by the one or more of a RAM, ROM, and machine-readable storage medium via a bus; and the one or more processors execute the received instructions. In some embodiments, the user management and session controller processing unit is an ASIC (Application-Specific Integrated Circuit). In some embodiments, the user management and session controller processing unit is a SoC (System-on-Chip).

Examples of output devices 1142 include, but are not limited to, display screens, light panels, and/or lighted displays. In accordance with particular embodiments, the one or more processors 1134 are operatively connected to audio output devices such as, but not limited to speakers, and/or sound amplifiers. In accordance with many of these embodiments, the one or more processors 1134 are operatively connected to tactile output devices like vibrators, and/or manipulators.

Examples of user input devices 1144 include, but are not limited to, tactile devices including but not limited to, keyboards, keypads, touch screens, and/or trackballs; non-contact devices such as audio input devices; motion sensors and motion capture devices that the user management and session controller can use to receive inputs from a user when the user interacts with the user management and session controller 1104.

The one or more communication interface and/or network interface devices 1146 provide one or more wired or wireless interfaces for exchanging data and commands between the user management and session controller 1104 and other devices that may be included in a fungible object award interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 1140 stores machine-executable instructions for various components of a user management and session controller, such as but not limited to: an operating system 1148; one or more application programs 1150; one or more device drivers 1152; and fungible object award interleaved wagering system user management and session controller instructions 1154 for use by the one or more processors 1134 to provide the features of a fungible object award interleaved wagering system user management and session controller as described herein.

In various embodiments, the machine-readable storage medium 1140 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 1140, the ROM 1138 or any other storage location. The respective machine-executable instructions are accessed by the one or more processors 1134 via the bus 1132, and then executed by the one or more processors 1134. Data used by the one or more processors 1134 are also stored in memory 1136, and the one or more processors 1134 access such data during execution of the machine-executable instructions. Execution of the machine-executable instructions causes the one or more processors 1134 to control the user management and session controller 1104 to provide the features of a fungible object award interleaved wagering system user management and session controller as described herein Although the user management and session controller 1104 is described herein as being constructed from or configured using one or more processors and machine-executable instructions stored and executed by hardware components, the user management and session controller can be composed of only hardware components in accordance with other embodiments. In addition, although the storage medium 1140 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 1140 can be accessed by the one or more processors 1134 through one of the interfaces or using a communication link. Furthermore, any of the user input devices or user output devices can be operatively connected to the one or more processors 1134 via one of the interfaces or using a communication link.

In various embodiments, the user management and session controller 1104 may be used to construct other components of a fungible object award interleaved wagering system as described herein.

In some embodiments, components of a user management and session controller and an application controller of a fungible object award wagering interleaved system may be constructed from or configured using a single device using processes that communicate using an interprocess communication protocol. In other such embodiments, the components of a user management and session controller and an application controller of a fungible object award wagering interleaved system may communicate by passing messages, parameters or the like.

In some embodiments, components of a user management and session controller and a wager controller of a fungible object award wagering interleaved system may be constructed from or configured using a single device using processes that communicate using an interprocess communication protocol. In other such embodiments, the components of a user management and session controller and an application controller of a fungible object award wagering interleaved system may communicate by passing messages, parameters or the like.

It should be understood that there may be many embodiments of a user management and session controller 1104 which could be possible, including forms where many modules and components of the user management and session controller are located in various servers and locations, so the foregoing is not meant to be exhaustive or all inclusive, but rather provide data on various embodiments of a user management and session controller 1104.

In numerous embodiments, any of a wager controller, an application controller, an interactive controller, or a user management and session controller as described herein can be constructed from or configured using multiple processing devices, whether dedicated, shared, or distributed in any combination thereof, or can be constructed from or configured using a single processing device. In addition, while certain aspects and features of fungible object award interleaved wagering system processes described herein have been attributed to a wager controller, an application controller, an interactive controller, or a user management and session controller, these aspects and features can be provided in a distributed form where any of the features or aspects can be provided by any of a user management and session controller, a wager controller, an application controller, and/or an interactive controller within a fungible object award interleaved wagering system without deviating from the spirit of the invention.

Although various components of fungible object award interleaved wagering systems are discussed herein, fungible object award interleaved wagering systems can be configured with any component as appropriate to the specification of a specific application in accordance with embodiments of the invention. In certain embodiments, components of a fungible object award interleaved wagering system, such as a user management and session controller, an application controller, a wager controller, and/or an interactive controller, can be configured in different ways for a specific fungible object award interleaved wagering system.

In some embodiments, components of a user management and session controller, an interactive controller, an application controller, and/or a wager controller of a fungible object award wagering interleaved system may be constructed from or configured using a single device using processes that communicate using an interprocess communication protocol. In many embodiments, the components of a user management and session controller, an interactive controller, an application controller and a wager controller of a fungible object award wagering interleaved system may communicate by passing messages, parameters or the like.

In addition, while certain aspects and features of fungible object award interleaved wagering system processes described herein have been attributed to a user management and session controller, a wager controller, an application controller, or an interactive controller, these aspects and features can be provided in a distributed form where any of the features or aspects can be provided by any of a user management and session controller, a wager controller, an application controller, and/or an interactive controller within a fungible object award interleaved wagering system.

Operation Of fungible object award Wagering Interleaved Systems

Figure 8:
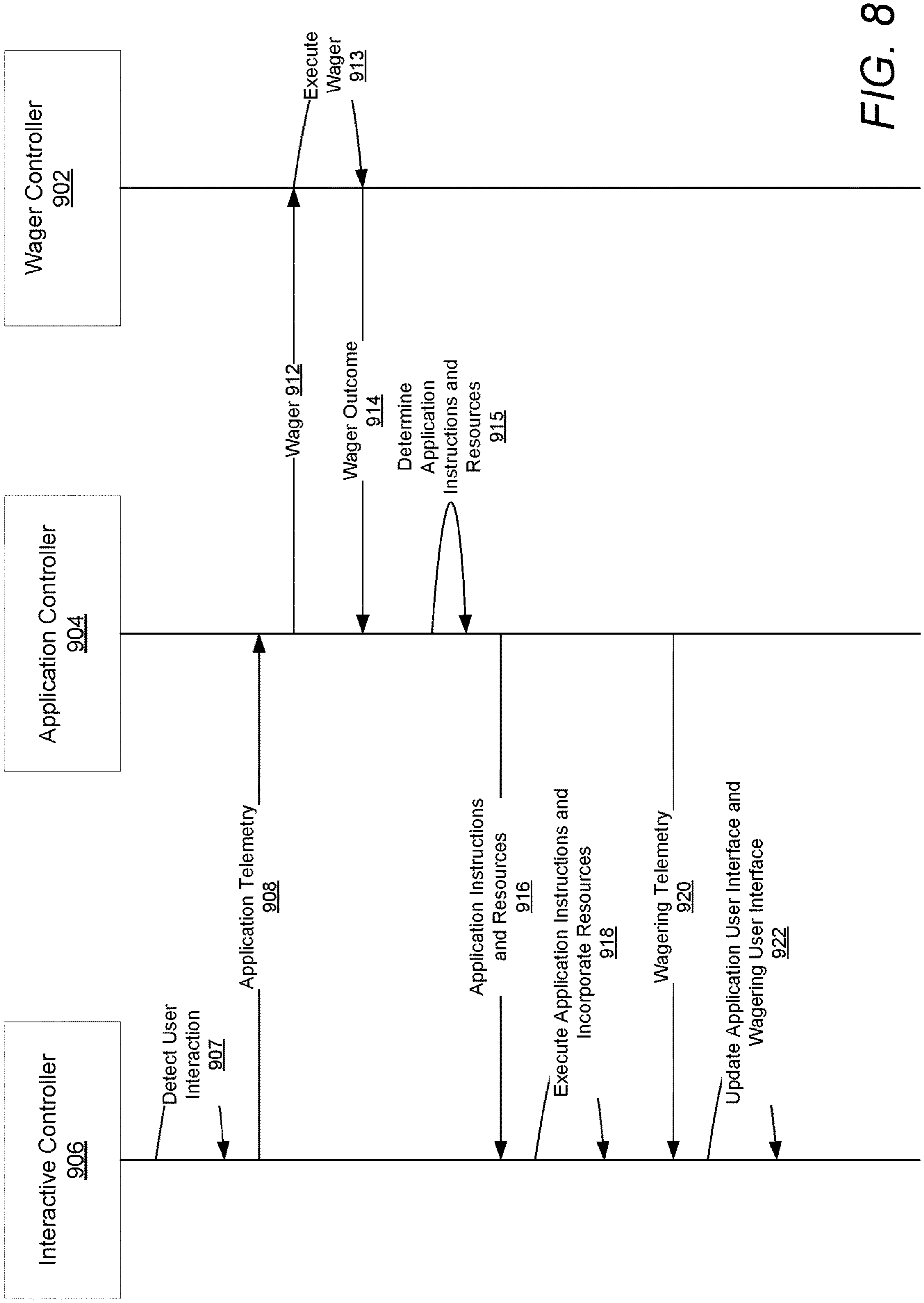
FIG. 8 is a sequence diagram of interactions between components of a fungible object award interleaved wagering system in accordance with various embodiments of the invention.

FIG. 8 is a sequence diagram of interactions between components of a fungible object award interleaved wagering system in accordance with various embodiments of the invention. The components of the fungible object award interleaved wagering system include a wager controller 902, such as wager controller 102 of FIG. 1A, an application controller 904, such as application controller 112 of FIG. 1A, and an interactive controller 906, such as interactive controller 120 of FIG. 1A. The process begins with the interactive controller 906 detecting a user performing a user interaction in a user interface of an interactive application provided by the interactive controller 906. The interactive controller 906 communicates application telemetry data 908 to the application controller 904. The application telemetry data includes, but is not limited to, the user interaction detected by the interactive controller 906.

The application controller 904 receives the application telemetry data 908. Upon determination by the application controller 904 that the user interaction indicates a wagering event, the application controller 904 communicates wager data 912 including a wager request to the wager controller 902. The request for a wager event may include wager terms associated with a wagering proposition.

The wager controller receives the wager data and uses the wager data to execute (913) a wager in accordance with a wagering proposition. The wager controller 902 communicates a wager outcome 914 of the executed wager to the application controller 904.

The application controller 904 receives the wager outcome and determines (915) interactive application instructions and resources 916 for the interactive application. In some embodiments, the application controller makes the determination using the wager outcome. In some embodiments, additional, enhanced or especially useful resources are allocated when the wager outcome is favorable to the user of the interactive application. In other embodiments, additional, enhanced or especially useful resources are allocated when the wager outcome is unfavorable to the user of the interactive application. In some embodiments, the wager outcome is not used to make the determination of the interactive application instructions and resources 916 as the user is awarded the interactive application instructions and resources 916 for wagering regardless of the wager outcome. The application controller 904 communicates the interactive application instructions and resources 916 to the interactive controller 906. The application controller also communicates wagering telemetry data 920 including the wager outcome to the interactive controller 906.

The interactive controller 906 receives the interactive application instructions and resources 916 and wagering telemetry data 918. The interactive controller 906 incorporates the received interactive application resources and executes the received interactive application instructions (918). The interactive controller updates (922) an application user interface of the interactive application provided by the interactive controller using the interactive application instructions and the resources, and updates (922) a wagering user interface using the wagering telemetry data.

In several embodiments, a user can interact with a fungible object award interleaved wagering system by using Cr for wagering in accordance with a wagering proposition along with AC and elements in interactions with an interactive application. Wagering can be executed by a wager controller while an interactive application can be executed by an interactive controller and managed with an application controller.

Figure 9:
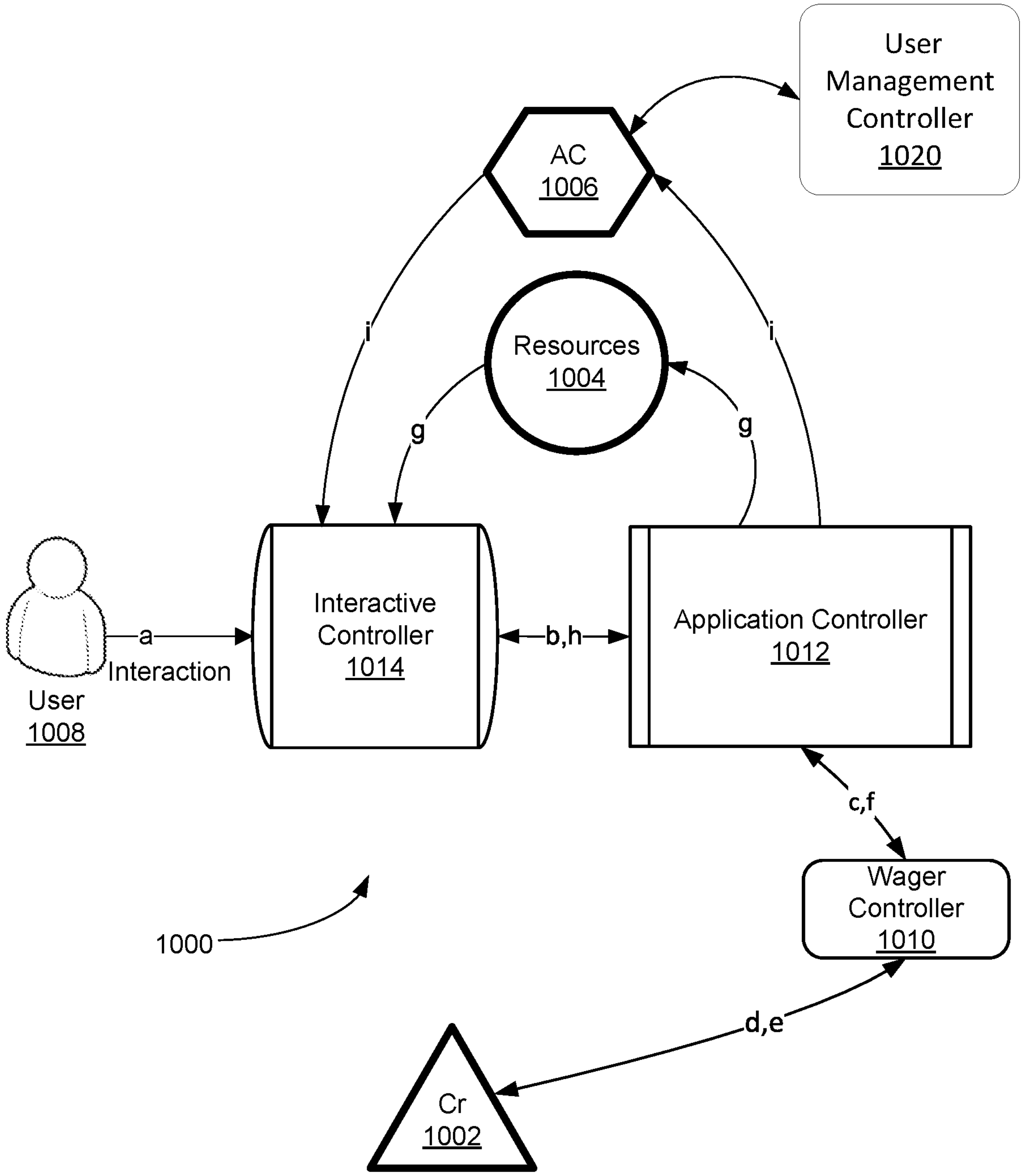
FIG. 9 is a collaboration diagram for components of a fungible object award interleaved wagering system in accordance with various embodiments of the invention.

FIG. 9 is a collaboration diagram that illustrates how resources such as AC, Cr, elements, and objects are utilized in a fungible object award interleaved wagering system in accordance with various embodiments of the invention. The collaboration diagram 1000 illustrates that Cr 1002, interactive application resources including elements and objects 1004 and AC 1006 can be utilized by a user 1008 in interactions with a wager controller 1010, such as wager controller 102 of FIG. 1A, an application controller 1012, such as wager controller 112 of FIG. 1A, and an interactive controller 1014, such as interactive controller 120 of FIG. 1A, of a fungible object award interleaved wagering system. The contribution of elements and objects such as included in resources 1004, can be linked to a user's access to credits, such as Cr 1002 and/or AC 1006. Electronic receipt of these credits can come via a smart card, voucher or other portable media, or as received using a communication link from a server. In some embodiments, these credits can be drawn on demand from a user profile located in a database locally on a fungible object award interleaved wagering system or in a remote server.

A user's actions and/or decisions can affect an interactive application of interactive controller 1014 that consume and/or accumulate AC 1004 and/or resources 1004 in an interactive application executed by an interactive controller 1014, a wager controller 101 and an application controller 1012. The application controller 1012 can monitor the activities taking place within an interactive application executed by an interactive controller 1014 for wagering event occurrences. The application controller 1012 can also communicate the wagering event occurrences to the wager controller 1010 that triggers a wager of Cr 1002 in accordance with a wagering proposition executed by the wager controller 1010.

In several embodiments, the user commences interaction with the fungible object award interleaved wagering system by contributing credit to a fungible object award interleaved wagering system such as, but not limited to, Cr 1002 that may be credit in a real currency or may be credit in a virtual currency that is not fungible with a real currency, AC 1006 that may be application environment credits, and specified types of interactive application elements and/or objects 1004. One or more of these contributions may be provided directly as currency and/or transferred in electronically. Electronic transfer may come via a smart card, voucher or other portable media, or as transferred in using a communication link from a user data server or fungible object award interleaved wagering system user management and session controller. In many embodiments, contributions may be drawn on demand from user accounts located in servers residing on the network or in the cloud on a real time basis as the credits, elements and/or object are committed or consumed by the fungible object award interleaved wagering system. Generally, Cr is utilized and accounted for by the wager controller 1010; and the resources 1004 and AC 1006 are utilized and accounted for by the application controller 1012 and/or the interactive controller 1014. The user interacts (a) with an interactive application provided by the interactive controller 1014 with the interaction representing an action by the user within the context of the interactive application. The interactive controller 1014 receives the user interaction and communicates (b) the interaction to the application controller 1012. The application controller 1012 receives the interaction and determines from the interaction whether or not a wager should be triggered. If a wager should be triggered, the application controller 1012 communicates (c) wager data about a wager in accordance with a wagering proposition associated with the interaction and thereby triggers a wager. The wager controller receives the wager data and executes the wager in accordance with the wagering proposition, and consumes (d) an appropriate amount of Cr 1002 for the wager. The wager controller 1010 adjusts (e) the Cr 1002 based upon a wager outcome of the wager and communicates (f) the wager outcome to the application controller 1012 as to the outcome of the wager triggered by the application controller 1012. The application controller 1012 receives the wager outcome. The application controller determines what resources 1004 should be provided to the interactive controller and communicates (g) the resources 1004 to the interactive controller. The interactive controller receives the resources from the application control and integrates them into the execution of the interactive application provided by the interactive controller 1014.

In some embodiments, the application controller 1012 communicates (h) data about the wager outcome to the interactive controller. The interactive controller receives the wager outcome and displays the wager outcome to the user 1008.

In some embodiments, the application controller 1012 determines what resources and instructions to provide to the interactive controller 1014 for use by the interactive application provided by the interactive controller 1014 partially on the basis of the wager outcome. In some such embodiments, resources are provided in a case that the wager was a winning wager for the user. In other such embodiments, fewer or no resources are provided in a case of a losing wager.

In some embodiments, the application controller 1012 determines what resources to provide based on internal logic of the application controller 1012. In some such embodiments, the application controller 1012 employs a random result generator, such as a P/RNG, to generate a random result and the random result is used to determine what resources are provided to the interactive controller 1014.

In several embodiments, the application controller 1012 determines an increment or a decrement of an amount of AC 1006 using the interactions received from the interactive controller. The increment or decremented amount is communicated (i) to the interactive controller for display to the user.

In some embodiments, the application controller 1012 executes a wager of Cr as a virtual currency, AC, elements or objects. In some such embodiments, the application controller 1012 employs a random result generator, such as a P/RNG, to generate a random result and the random result is used to determine a wager outcome in Cr as a virtual currency, AC, elements or objects.

The following is description of an embodiment of the described collaboration where an interactive application provided by an interactive controller of a fungible object award interleaved wagering system is a first person shooter game. The process begins by a user selecting a machine gun to use in the game and then fires a burst of bullets at an opponent. The interactive controller can communicate to the application controller of the user's choice of weapon, that a burst of bullets was fired, and/or the outcome of the burst. The application controller communicates to the wager controller that 3 credits (Cr) are to be wagered on the outcome of a wagering event to match the three bullets consumed. The wager controller then performs the wagering event and determines the result of the wager and may determine the winnings from a paytable. The wager controller consumes 3 credits of Cr for the wager and executes the specified wager. By way of example, the wager controller may determine that the user hit a jackpot of 6 credits and returns the 6 credits to the Cr and communicates to the application controller that 3 net credits were won by the user.

The application controller communicates to the interactive controller to add 3 bullets to an ammunition clip. The interactive controller adds 3 bullets back to the ammo clip. The ammunition may be added by directly adding the ammunition to the clip or by allowing the user to find extra ammunition during use. The application controller logs the new user score (AC) in the game (as a function of the successful hit on the opponent) based on the interactive controller communication, and adds 2 extra points to the user score since a jackpot has been won. The application controller then adds 10 points to the user score (AC) given the success of the hit which in this example is worth 8 points, plus the 2 extra point. Note that this example is only intended to provide an illustration of how credits flow in a fungible object award interleaved wagering system, but is not intended to be exhaustive and only lists only one of numerous possibilities of how a fungible object award interleaved wagering system may be configured to manage its fundamental credits.

In many embodiments, user management and session controller 1020, such as user account controller 150 of FIG. 1A, of a fungible object award interleaved wagering system is used to store AC for use of the user. In such an embodiment, AC is generated by the application controller based on the user's use of the fungible object award interleaved wagering system and an amount of the AC is communicated to the user management and session controller 1020. The user management and session controller stores the amount of AC between user sessions. In some embodiments, the user management and session controller communicates an amount of AC to the application controller at the start of a user session for use by the user during a user session.

In some embodiments, objects that are usable in an interactive application may be awarded in response to a successful wager outcome instead of RC. The user may use the object or may sell the object in return for an RC value. In some embodiments, use of the awarded object may be treated as an in-application purchase, and by initially awarding the user the object instead of the RC value, in-application purchases and a richer experience may be encouraged.

In some embodiments, in addition to requiring funds, the fungible object award interleaved wagering system may require certain EE or game objects to operate. A certain amount of these objects or EE may already provided to the user of the system as part of an interactive game provided by the interactive controller. However, the user may perform better with more or better resources. In some embodiments, objects may be provided to users in response to a successful wagering outcome such that the user may have better resources that may aid better performance.

Figure 10:
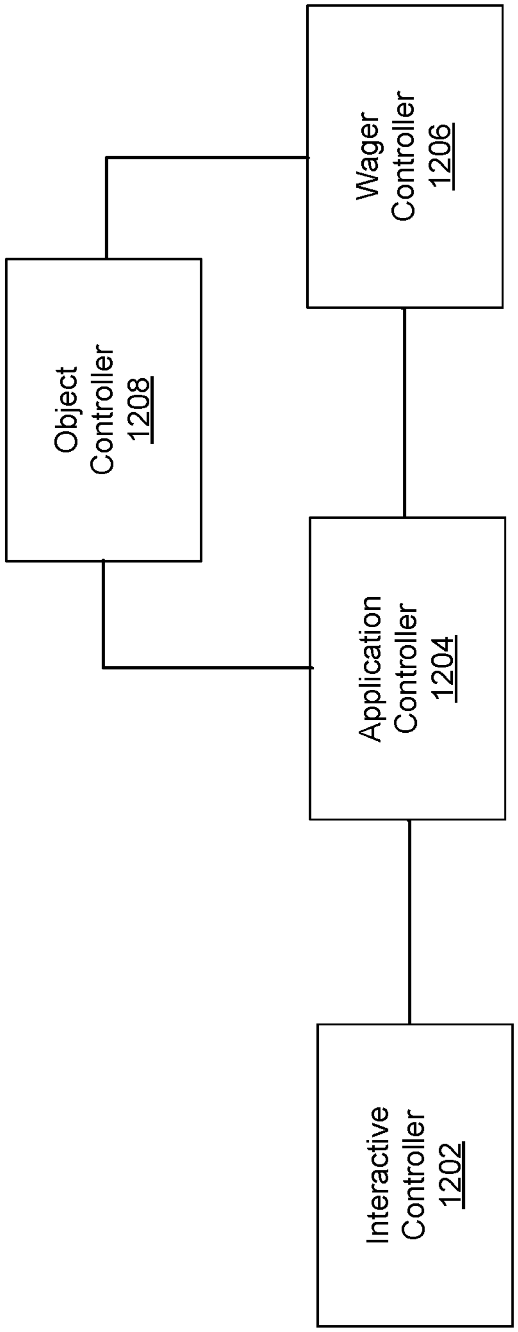
FIG. 10 is a diagram of a structure of a fungible object award interleaved wagering system in accordance with various embodiments of the invention.
Figure 11:
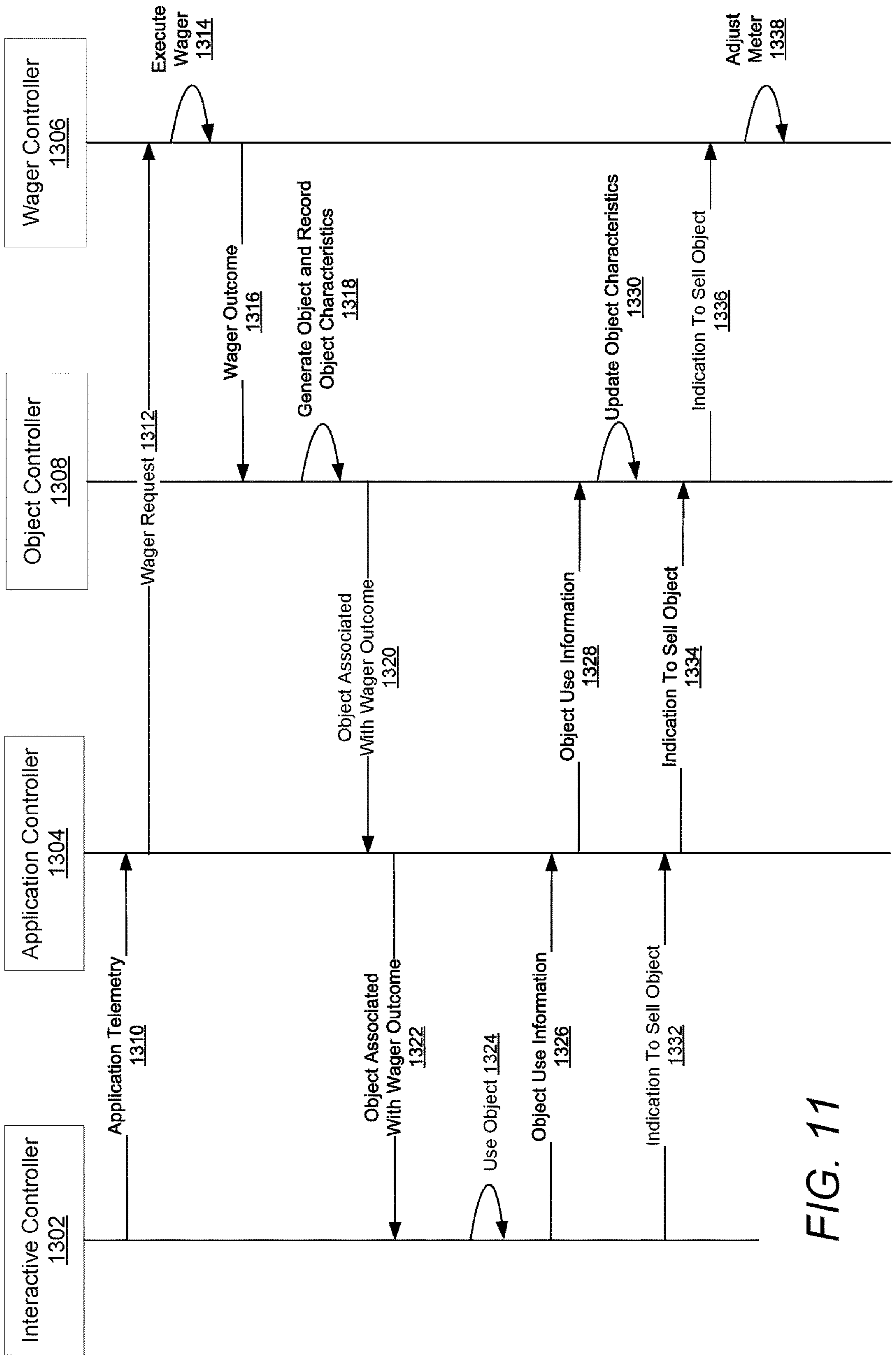
FIG. 11 is a sequence diagram of interactions between components of a fungible object award interleaved wagering system in accordance with various embodiments of the invention.

FIG. 10 is a diagram of a structure of a fungible object award interleaved wagering system in accordance with various embodiments of the invention. The system includes an interactive controller 1202, an application controller 1204, and a wager controller 1206, each as described herein. The system also includes an object controller 1208. The interactive controller 1202 is operatively connected to the application controller 1204. The application controller 1204 is operatively connected to the interactive controller 1202, the object controller 1208 and the wager controller 1206. The wager controller 1206 is operatively connected to the application controller 1204 and the object controller 1208. The object controller 1208 is operatively connected to the application controller 1204 and the wager controller 1206. In some embodiments, the object controller 1208 is responsible for generating objects and maintaining a record of object characteristics. In some embodiments, the object controller 1208 is a separate controller from the application controller 1204. In some embodiments, the object controller 1208 is a part of the application controller 1204.

In some embodiments, a wager may be triggered during interaction with the system and an embodiment of the wager process may be one or more spinning reels which come to a stop. In some embodiments, a wager is triggered by the application controller 1204 and the application controller 1204 communicates a wager request to a wager controller 1206. The wager controller 1206 receives the wager request from the application controller 1204 and generates a wager outcome. The generated wager outcome is communicated from the wager controller 1206 to the application controller 1204. The application controller 1204 receives the wager outcome from the wager controller 1206. In an embodiment where the wager process is represented by one or more spinning reels, when the one or more reels come to a stop, one or more icons may line up and an object associated with the icon may be awarded to the user.

The object awarded to the user may be converted to RC at any time, but may also be useful in the interactive game in some manner. In an example embodiment, if the interactive game is a fantasy role playing game, and a wager is triggered, the wager outcome may be a magic wand, which is awarded to the user. In the example embodiment, the magic wand may be a powerful wand used to destroy a particular class of demons, and the user may be motivated to use it. In the example embodiment, the wand may also be worth $5. The user may sell the wand for $5 and have the $5 added to the user's meter on the wager controller, or the user may use the wand in the interactive game.

The user uses the object in the interactive application provided by the interactive controller 1202. Once the object is used, the interactive controller 1202 communicates, to the application controller 1204, object use information. Object use information may include ownership information, such as an identifier of the user, or durability information, such as number of times used or amount of time elapsed since creation of the object. The object use information may be communicated by the interactive controller 1202 upon an indication of use by the user, or after the conclusion of use by the user.

The application controller 1204 receives, from the interactive controller 1202, object use information. The application controller 1204 communicates, to the object controller 1208, the object use information. The object controller 1208 receives, from the application controller 1204, the object use information.

Once the object controller 1208 has received the object use information, the object controller 1208 updates object characteristics. In some embodiments, the durability information associated with the object is updated.

The object may be sold in exchange for an RC value of the object. The interactive controller 1202 communicates, to the application controller 1204 an indication to sell the object. The indication to sell the object may include an identifier associated with the object. The application controller 1204 receives, from the interactive controller 1202, the indication to sell the object.

The application controller 1204 communicates, to the object controller 1208, an indication to sell the object. The indication to sell the object may include an identifier associated with the object. In some embodiments, an identification of the wager controller 1206 is also communicated.

The object controller 1208 receives, from the application controller 1204, the indication to sell the object. The object controller 1208 communicates, to the wager controller 1206, an indication to sell the object. The indication to sell the object may also include the value of the object. The wager controller 1206 receives, from the object controller 1208, the indication to sell the object.

Upon receiving the indication to sell the object, the wager controller 1206 adjusts an RC meter associated with the user to reflect the sale of the object. The RC meter associated with the user is credited with the RC value associated with the object. In some embodiments, when the meter is adjusted, use of the object by the user is disabled and the object does not appear as an object owned by the user.

In some embodiments, use of the object in the game instead of cashing it in for an RC value effectively takes a context based win and converts it seamlessly to an in-application purchase. In some embodiments, since the objects have an objective value, a return to player is calculable. The user, by consuming or using the objects in the interactive game instead of converting the objects to RC, is simply electing to take some of the credits on the user's meter and use those credits in the same manner as an in-application purchase.

In some embodiments, the object may be exchanged for RC at any point, even after use by the user. However, the value of the object may depreciate. In some embodiments, the object depreciates based on use. In some embodiments, the object depreciates based on time. In an example embodiment, the interactive game is a car racing game and a user may win a special car worth $100 as a result of a wager. In the example embodiment, the user may elect at any time before putting it into use in the car racing game to sell it for $100. If however, the user uses the special car in the game, it depreciates in value and upon later sale, it may only be worth $75.

In some embodiments, users may trade and sell objects to other users in the closed community of the interactive game store. In some embodiments, the objects may not leave the closed community so the objects do not become a new type of currency, but the objects can be traded back in for RC at the rate the object was worth initially (or after depreciation in the case of a used durable good) at any time by the possessor of the object. In some embodiments, the system is "social" in nature, as the objects may be treated in a similar manner as trading cards.

In some embodiments, an interactive controller 1202 may communicate, to the application controller 1204, an indication to trade an object to another user. In some embodiments, the indication to trade includes an identifier associated with the object. In some embodiments, the indication to trade also includes an identifier associated with a user giving up the object in exchange for another object or RC, and/or an identifier associated with a user acquiring the object in exchange for another object or RC. The application controller 1204 receives the indication to trade from the interactive controller 1202.

The application controller 1204 communicates, to the object controller 1208, the indication to trade. The object controller 1208 receives, from the application controller 1204, the indication to trade. The object controller 1208 updates object characteristics to reflect the trade. In some embodiments, owner information associated with the traded object is modified. In some embodiments, durability information associated with the traded object may be modified.

The object controller 1208 communicates, to the wager controller 1206, an indication to adjust the RC meters associated with the user giving up the object and the user acquiring the object.

In some embodiments, a user may populate a mini-warehouse of useful objects or EE. The user may exchange these at any time and obtain RC instead.

In an example embodiment of a racing game, the reels may reveal 2 cans of gas and an oil slick. In the example, the oil slick may be worthless in the game, but the two gas cans are worth $10 each. However, if a user decides to consume the gas cans in the game, the user may be able to drive faster or longer for a better score, or may trade the two gas cans away to another user in the community for something else the user wants in the game. However, the moment the gas is consumed, in the example embodiment, the use of the gas is effectively treated as an in-application purchase. In some embodiments, the in-application purchase is a seamless one.

In some embodiments, the concept applies to wagers of: Unrestricted Credits ("URC"), Restricted Credits ("RRC"), Virtual Currency ("VRC"), or Application Credit. That is, if the wager was in URC, the user may convert the objects in their inventory back into URC at any time, or perhaps a greater amount of RRC, a large amount of VRC or GWC. In some embodiments, the last 3 result in a higher game performance. In some embodiments, each object may have associated with it the native source of the currency for the wager (e.g., URC or RRC) so that the winnings can be correctly sourced depending on the business logic of the system.

In some embodiments, upon a service interruption, system failure, power failure, unexpected log-off, or chain break with the user, the inventory on hand may automatically be converted back into the same species as the funding source (e.g., URC or RRC).

In some embodiments, an auxiliary reel may contain objects which are not fungible but useful in the game. In some embodiments, the user warehouse may clearly segregate these non-fungible items from the fungible items. In an example embodiment of a racing game, a rocket boost may provide the user a 3 or 4 car lead in a sprint race for instance, but the rocket boost may not be fungible beyond the use within the game. In some embodiments, the non-fungible items may still be traded. Since all objects have their native fungible currency associated with them, wherever the object traveled, it would only be useful in the interactive game.

In some embodiments, the object warehouse for a user may be persistent game to game. In other embodiments, the object warehouse for the user may be persistent session to session.

In other embodiments, upon exit of a game session, all objects in the warehouse are converted to their native currency and the accounts settled. In the case of RC objects, the meter would be loaded as the warehouse was "sold off".

FIG. 10 is a sequence diagram of interactions between components of a fungible object award interleaved wagering system in accordance with various embodiments of the invention. The system includes an interactive controller 1302, an application controller 1304, a wager controller 1306, and an object controller 1308, as described herein. In some embodiments, the interactive controller 1302 provides an interactive application. In some embodiments, the interactive application is an interactive game. In some embodiments, the interactive game is a skill-based game. In some embodiments, the interactive game is a chance-based game.

The interactive controller 1302 communicates, to the application controller 1304, application telemetry (1310). The application controller 1304 receives, from the interactive controller 1302, the application telemetry (1310). The application controller determines whether a wager request is triggered based on the received application telemetry. In some embodiments, certain actions taken by the user in the interactive application or certain events occurring in the interactive application may trigger a wager request.

The application controller 1304 communicates, to the wager controller 1306, the wager request (1312). The wager controller 1306 receives, from the application controller 1304, the wager request (1312). The wager controller 1306 executes the wager (1314). The wager controller 1306 communicates, to the object controller 1308, the wager outcome (1316). The object controller 1308 receives, from the wager controller 1306, the wager outcome (1316).

The object controller 1308 generates an object based on the wager outcome and object characteristics of the generated object are recorded (1318). In some embodiments, an object is generated when a successful wager outcome is received from the wager controller 1306. In some embodiments, upon generating an object, a record of the object is created. In some embodiments, the record is associated with the object characteristics. In some embodiments, the record of the object and/or the object characteristics is stored in an indexable format, such as a table.

In some embodiments, the object characteristics include creation information associated with the object. In some embodiments, creation information includes time and/or date of generation of the object. In some embodiments, creation information also includes an identifier associated with the object controller 1308 which generated the object.

The object characteristics may also include ownership information, such as an identifier for the user associated with the interactive controller 1302. In some embodiments, the ownership information may be updated in order to reflect a transfer of ownership of the object from one user to another.

The object characteristics may also include durability information. In some embodiments, durability information represents use of the object by the user. In some embodiments, an RC value of the object is based on the durability information. In some embodiments, the depreciation of the value of the object based on usage is linear. In an example embodiment, if the object is worth $100 upon generation, each time the object is used, the object may decrease by $5. In some embodiments, the depreciation of the value of the object based on usage is non-linear. In an example embodiment, if the object is worth $100 upon generation, each time the object is used, the object value may decrease by 20% of the current value. In another example embodiment, the object value may decrease by 50% the first time it is used, and may decrease by 10% of the current value each time it is used thereafter. In some embodiments, the number of times the object is used may be included in the object characteristics associated with the object.

The object associated with the wager outcome is communicated from the object controller 1308 to the application controller 1304 (1320). The application controller 1304 receives, from the object controller 1308, the object associated with the wager outcome (1320). The application controller 1304 communicates, to the interactive controller 1302, the object associated with the wager outcome (1322). The interactive controller 1302 receives, from the application controller 1304, the object associated with the wager outcome (1322).

The user uses the object in the interactive application provided by the interactive controller 1302 (1324). Once the object is used, the interactive controller 1302 communicates, to the application controller 1304, object use information (1326). Object use information may include ownership information or durability information, as described herein. The object use information may be communicated by the interactive controller 1302 upon an indication of use by the user, or after the conclusion of use by the user.

The application controller 1304 receives, from the interactive controller 1302, object use information (1326). The application controller 1304 communicates, to the object controller 1308, the object use information (1328). The object controller 1308 receives, from the application controller 1304, the object use information (1328).

Once the object controller 1308 has received the object use information, the object controller 1308 updates object characteristics (1330). In some embodiments, the durability information associated with the object is updated.

As described herein, the object may be sold in exchange for an RC value of the object. The interactive controller 1302 communicates, to the application controller 1304 an indication to sell the object (1332). The indication to sell the object may include an identifier associated with the object. The application controller 1304 receives, from the interactive controller 1302, the indication to sell the object (1332).

The application controller 1304 communicates, to the object controller 1308, the indication to sell the object (1334). The indication to sell the object may include an identifier associated with the object. In some embodiments, an identification of the wager controller 1306 is also communicated.

The object controller 1308 receives, from the application controller 1304, the indication to sell the object (1334). The object controller 1308 communicates, to the wager controller 1306, the indication to sell the object (1336). The indication to sell the object may also include the value of the object. The wager controller 1306 receives, from the object controller 1308, the indication to sell the object (1336). In some embodiments, the indication to sell the object may be communicated directly from the application controller 1304 to the wager controller 1306, and the wager controller 1306 receives the indication to sell the object from the application controller 1304.

Upon receiving the indication to sell the object, the wager controller 1306 adjusts an RC meter associated with the user to reflect the sale of the object. The RC meter associated with the user is credited with the RC value associated with the object. In some embodiments, when the meter is adjusted, use of the object by the user is disabled and the object does not appear as an object owned by the user.

While the above description may include many specific embodiments of the invention, these should not be construed as limitations on the scope of the invention, but rather as examples of embodiments thereof. It is therefore to be understood that the present invention can be practiced otherwise than specifically described, without departing from the scope and spirit of the present invention. Thus, embodiments of the present invention described herein should be considered in all respects as illustrative and not restrictive.

What is claimed:

1. A fungible object award interleaved wagering system, comprising:

a plurality of interactive controllers operatively connected to an application controller by a network, each interactive controller constructed to:

provide participation by a respective user in a tournament of an interactive application;

distribute, to an application controller, application telemetry of the respective user's performance in the tournament;

receive, from the application controller, an object based on the application telemetry, wherein the object is to be used by the respective user in the tournament; and generate a visual display of the object within the interactive application;

a wager controller operatively connected to the application controller, the wager controller constructed to:

receive a credit input;

receive, from the application controller, a wager request;

generate a wager outcome based on the wager request using a random number generator; and distribute, to an object controller, the wager outcome; and the application controller operatively connected to the plurality of interactive controllers and the wager controller, the application controller constructed to:

receive, from one of the plurality of interactive controllers, the application telemetry;

distribute, to the wager controller, the wager request based on the received application telemetry;

receive, from the object controller, the object, wherein the object is generated by the object controller based on the wager outcome; and distribute, to the one of the plurality of interactive controllers, the object.

2. The fungible object award interleaved wagering system of claim 1, wherein the wager controller and the application controller are constructed from a same device.

3. The fungible object award interleaved wagering system of claim 1, wherein the wager controller and the application controller are constructed from different devices.

4. The fungible object award interleaved wagering system of claim 3, wherein the wager controller is operatively connected to the application controller by the network.

5. The fungible object award interleaved wagering system of claim 1, wherein the object controller is constructed to:

receive, from the wager controller, the wager outcome;

generate the object based on the wager outcome; and distribute, to the application controller, the generated object.

6. The fungible object award interleaved wagering system of claim 5, wherein the object controller is further constructed to record object characteristics associated with the generated object upon generating the object.

7. The fungible object award interleaved wagering system of claim 1, wherein the one of the plurality of interactive controllers is further constructed to:

distribute, to the application controller, object use information, the object use information based on use of the object in the interactive application provided by the one of the plurality of interactive controllers, the application controller is further constructed to:

receive, from the one of the plurality of interactive controllers, the object use information; and distribute, to the object controller, the object use information, wherein the object controller uses the object use information to update object characteristics associated with the object.

8. The fungible object award interleaved wagering system of claim 7, wherein the object use information comprises durability information.

9. The fungible object award interleaved wagering system of claim 1, wherein the one of the plurality of interactive controllers is further constructed to distribute, to the application controller, an indication to sell the object, wherein the application controller is further constructed to:

receive, from the one of the plurality of interactive controllers, the indication to sell the object; and distribute, to the object controller, the indication to sell the object, and wherein the wager controller is further constructed to:

receive, from the object controller, the indication to sell the object; and adjust a meter associated with the user to reflect sale of the object.

10. The fungible object award interleaved wagering system of claim 9, wherein the indication to sell the object comprises an object value.

11. The fungible object award interleaved wagering system of claim 9, wherein the one of the plurality of interactive controllers is further constructed to disable use of the object in an interactive application provided by the one of the plurality of interactive controllers upon sale of the object.

* * * * *